United States Patent
Evans et al.

(10) Patent No.: US 9,823,474 B2
(45) Date of Patent: Nov. 21, 2017

(54) SYSTEM, APPARATUS, AND METHOD FOR DISPLAYING AN IMAGE WITH A WIDER FIELD OF VIEW

(71) Applicants: Allan Thomas Evans, San Francisco, CA (US); D. Scott Dewald, Dallas, TX (US)

(72) Inventors: Allan Thomas Evans, San Francisco, CA (US); D. Scott Dewald, Dallas, TX (US)

(73) Assignee: AVEGANT CORP., Belmont, CA (US)

( * ) Notice: Subject to any disclaimer, the term of this patent is extended or adjusted under 35 U.S.C. 154(b) by 0 days.

(21) Appl. No.: 14/676,996

(22) Filed: Apr. 2, 2015

(65) Prior Publication Data
US 2016/0291326 A1 Oct. 6, 2016

(51) Int. Cl.
G02B 27/01 (2006.01)
G02B 3/04 (2006.01)

(52) U.S. Cl.
CPC ........... G02B 27/0172 (2013.01); G02B 3/04 (2013.01); G02B 27/01 (2013.01); G02B 27/0101 (2013.01); G02B 2027/011 (2013.01); G02B 2027/0123 (2013.01)

(58) Field of Classification Search
CPC ............. G02B 27/0172; G02B 27/017; G02B 2027/011; G02B 2027/0123; G02B 2027/0145; G02B 2027/0178; G02B 3/04
USPC .............. 359/631, 630, 629, 13, 14; 353/35; 345/8, 7, 9
See application file for complete search history.

(56) References Cited

U.S. PATENT DOCUMENTS

| | | |
|---|---|---|
| 2,149,341 A | 3/1939 | Harrison |
| D132,442 S | 5/1942 | Montgomery |
| 3,356,439 A | 12/1967 | Magnus |
| D246,259 S | 11/1977 | Nishimura et al. |
| D254,183 S | 2/1980 | Doodson |
| D262,019 S | 11/1981 | Upshaw |
| D270,634 S | 9/1983 | Ungar |
| 4,459,470 A | 7/1984 | Shlichta et al. |
| 4,553,534 A | 11/1985 | Stiegler |
| 4,859,030 A | 8/1989 | Rotier |

(Continued)

FOREIGN PATENT DOCUMENTS

| | | |
|---|---|---|
| CN | 2651774 | 10/2004 |
| CN | 202306016 U | 7/2012 |

(Continued)

OTHER PUBLICATIONS

"Binocular Disparity", Collins English Dictionary, <http://www.dictionary.com/browse/binocular-disparity, Retrieved on Apr. 11, 2016, 2 pages.

(Continued)

Primary Examiner — William R Alexander
(74) Attorney, Agent, or Firm — HIPLegal LLP; Judith Szepesi

(57) ABSTRACT

A system (100), apparatus (110), and method (900) for displaying an image (880). The system (100) can use an aspherical lens (450) to direct light (800) in the interim image (850) towards the viewer (96) of the final image (880) displayed by the system (100). Use of the aspherical lens (450) expands the FOV (860) accessible to the viewer (96) and reduces exit pupil drift (480).

19 Claims, 22 Drawing Sheets

(56) References Cited

U.S. PATENT DOCUMENTS

| | | |
|---|---|---|
| 4,961,626 A | 10/1990 | Fournier et al. |
| D313,092 S | 12/1990 | Nilsson |
| 5,047,006 A | 9/1991 | Brandston et al. |
| 5,095,382 A | 3/1992 | Abe |
| 5,106,179 A | 4/1992 | Kamaya et al. |
| D328,461 S | 8/1992 | Daido et al. |
| D338,010 S | 8/1993 | Yamatogi |
| 5,266,070 A | 11/1993 | Hagiwara et al. |
| 5,303,085 A | 4/1994 | Rallison |
| 5,467,104 A * | 11/1995 | Furness, III ........... G02B 26/10 345/8 |
| 5,552,922 A | 9/1996 | Magarill |
| 5,624,156 A | 4/1997 | Leal et al. |
| D388,114 S | 12/1997 | Ferro |
| 5,794,127 A | 8/1998 | Lansang |
| 5,844,656 A | 12/1998 | Ronzani et al. |
| 5,886,822 A | 3/1999 | Spitzer |
| 5,931,534 A | 8/1999 | Hutter |
| 5,945,965 A | 8/1999 | Inoguchi et al. |
| 5,984,477 A | 11/1999 | Weissman et al. |
| 5,991,085 A | 11/1999 | Rallison et al. |
| 5,991,087 A | 11/1999 | Rallison |
| 6,008,781 A * | 12/1999 | Furness, III ......... G02B 27/017 345/8 |
| 6,016,385 A | 1/2000 | Yee et al. |
| 6,097,543 A | 8/2000 | Rallison et al. |
| 6,185,045 B1 | 2/2001 | Hanano |
| 6,342,871 B1 | 1/2002 | Takeyama |
| 6,351,252 B1 | 2/2002 | Atsumi et al. |
| 6,386,706 B1 * | 5/2002 | McClure ................ A61B 3/024 351/237 |
| 6,437,915 B2 | 8/2002 | Moseley et al. |
| D467,580 S | 12/2002 | Mori |
| D484,485 S | 12/2003 | Matsuoka |
| 6,678,897 B2 | 1/2004 | Lindgren |
| 6,721,750 B1 | 4/2004 | Jones et al. |
| 6,724,906 B2 | 4/2004 | Naksen et al. |
| 6,932,090 B1 | 8/2005 | Reschke et al. |
| 7,245,735 B2 | 7/2007 | Han |
| 7,275,826 B2 | 10/2007 | Liang |
| D556,187 S | 11/2007 | Feng |
| D560,654 S | 1/2008 | Feng |
| D567,215 S | 4/2008 | Lee |
| D570,825 S | 6/2008 | Schultz et al. |
| 7,388,960 B2 | 6/2008 | Kuo et al. |
| D587,683 S | 3/2009 | Ham et al. |
| 7,604,348 B2 | 10/2009 | Jacobs et al. |
| 7,697,203 B2 | 4/2010 | Cha et al. |
| 7,735,154 B2 | 6/2010 | Gellis et al. |
| D632,668 S | 2/2011 | Brunner et al. |
| D638,397 S | 5/2011 | McManigal |
| D640,256 S | 6/2011 | So |
| 7,959,296 B2 | 6/2011 | Cowan et al. |
| 8,006,320 B1 | 8/2011 | Rohbani |
| 8,057,036 B2 | 11/2011 | Hess et al. |
| 8,094,120 B2 | 1/2012 | Ratai |
| 8,094,927 B2 | 1/2012 | Jin et al. |
| 8,106,938 B2 | 1/2012 | Tzschoppe |
| D656,480 S | 3/2012 | McManigal et al. |
| 8,144,079 B2 | 3/2012 | Mather et al. |
| 8,144,274 B2 | 3/2012 | Lee |
| D657,344 S | 4/2012 | Brunner et al. |
| 8,149,342 B2 | 4/2012 | Ijzerman et al. |
| 8,154,800 B2 | 4/2012 | Kean et al. |
| 8,162,482 B2 | 4/2012 | DeCusatis et al. |
| D660,823 S | 5/2012 | Hardi et al. |
| D660,824 S | 5/2012 | Hardi et al. |
| 8,194,058 B2 | 6/2012 | Shestak et al. |
| 8,208,715 B2 | 6/2012 | Lau et al. |
| 8,212,810 B2 | 7/2012 | Naske et al. |
| 8,243,126 B2 | 8/2012 | Louwsma et al. |
| 8,244,027 B2 | 8/2012 | Takahashi |
| 8,284,235 B2 | 10/2012 | Held et al. |
| D673,136 S | 12/2012 | Kelly et al. |
| D673,520 S | 1/2013 | Tan |
| D674,767 S | 1/2013 | Brunner et al. |
| 8,362,974 B2 | 1/2013 | Miyake et al. |
| D675,595 S | 2/2013 | Cho et al. |
| D683,329 S | 5/2013 | Hagelin |
| 8,451,229 B2 | 5/2013 | Otsuki et al. |
| 8,508,830 B1 | 8/2013 | Wang |
| 8,545,013 B2 | 10/2013 | Hwang et al. |
| D693,791 S | 11/2013 | Troy |
| D695,263 S | 12/2013 | Mogili |
| 8,605,935 B1 | 12/2013 | Huang |
| D697,495 S | 1/2014 | Lian |
| D699,702 S | 2/2014 | Chen |
| D704,704 S | 5/2014 | Tatara et al. |
| D709,880 S | 7/2014 | Kim et al. |
| D715,255 S | 10/2014 | Nunez et al. |
| D720,721 S | 1/2015 | Lu |
| D722,041 S | 2/2015 | Sparks et al. |
| 8,964,298 B2 | 2/2015 | Haddick et al. |
| D724,560 S | 3/2015 | Galler |
| D727,278 S | 4/2015 | Solomon et al. |
| D727,280 S | 4/2015 | Levine |
| D727,281 S | 4/2015 | Levine |
| D727,288 S | 4/2015 | Yamasaki et al. |
| D728,512 S | 5/2015 | Nakagawa |
| D729,196 S | 5/2015 | Liu |
| D729,198 S | 5/2015 | Brunner et al. |
| 9,036,849 B2 | 5/2015 | Thompson et al. |
| 9,042,948 B2 | 5/2015 | Serota |
| D733,090 S | 6/2015 | Petersen |
| 9,158,115 B1 | 10/2015 | Worley et al. |
| 9,223,136 B1 | 12/2015 | Braun et al. |
| 9,529,191 B2 | 12/2016 | Sverdrup et al. |
| 2002/0070590 A1 | 6/2002 | Carstens |
| 2002/0089469 A1 | 7/2002 | Cone et al. |
| 2002/0175880 A1 | 11/2002 | Melville et al. |
| 2002/0186180 A1 | 12/2002 | Duda |
| 2003/0058209 A1 | 3/2003 | Balogh |
| 2003/0095081 A1 | 5/2003 | Furness et al. |
| 2003/0164814 A1 | 9/2003 | Starkweather et al. |
| 2003/0210801 A1 | 11/2003 | Naksen et al. |
| 2004/0113867 A1 | 6/2004 | Tomine et al. |
| 2005/0116922 A1 | 6/2005 | Kim |
| 2005/0195277 A1 | 9/2005 | Yamasaki |
| 2005/0206583 A1 | 9/2005 | Lemelson et al. |
| 2006/0028400 A1 * | 2/2006 | Lapstun ................ G02B 26/06 345/8 |
| 2006/0181482 A1 | 8/2006 | Iaquinto |
| 2006/0181484 A1 | 8/2006 | Sprague et al. |
| 2006/0238717 A1 | 10/2006 | Maximus et al. |
| 2007/0081248 A1 | 4/2007 | Wu |
| 2007/0091272 A1 | 4/2007 | Lerner et al. |
| 2007/0093118 A1 | 4/2007 | Pond et al. |
| 2007/0097277 A1 | 5/2007 | Hong et al. |
| 2007/0273983 A1 | 11/2007 | Hebert |
| 2008/0158672 A1 | 7/2008 | McCosky |
| 2009/0015917 A1 | 1/2009 | Iwamoto et al. |
| 2009/0039692 A1 | 2/2009 | Tuckey et al. |
| 2009/0152915 A1 | 6/2009 | Krasna et al. |
| 2009/0206641 A1 | 8/2009 | Brown |
| 2009/0262044 A1 | 10/2009 | Otsuki et al. |
| 2009/0276238 A1 | 11/2009 | Filipovich et al. |
| 2010/0007852 A1 | 1/2010 | Bietry et al. |
| 2010/0073469 A1 | 3/2010 | Fateh |
| 2010/0103676 A1 | 4/2010 | Noeth |
| 2010/0182688 A1 | 7/2010 | Kim et al. |
| 2010/0231579 A1 | 9/2010 | Kanbayashi et al. |
| 2010/0301640 A1 | 12/2010 | Heiser |
| 2011/0002533 A1 | 1/2011 | Inoue et al. |
| 2011/0007132 A1 | 1/2011 | Redmann et al. |
| 2011/0018903 A1 | 1/2011 | Lapstun et al. |
| 2011/0037829 A1 | 2/2011 | Hata |
| 2011/0044046 A1 | 2/2011 | Abu-Ageel |
| 2011/0063203 A1 | 3/2011 | Hong |
| 2011/0085727 A1 | 4/2011 | Yoon et al. |
| 2011/0096147 A1 | 4/2011 | Yamazaki et al. |
| 2011/0109133 A1 | 5/2011 | Galbreath et al. |
| 2011/0134229 A1 | 6/2011 | Matsumoto et al. |
| 2011/0134497 A1 | 6/2011 | Horimai |
| 2011/0141240 A1 | 6/2011 | Dutta et al. |

(56) References Cited

U.S. PATENT DOCUMENTS

| | | |
|---|---|---|
| 2011/0141244 A1 | 6/2011 | Vos et al. |
| 2011/0157696 A1 | 6/2011 | Bennett et al. |
| 2011/0193248 A1 | 8/2011 | Hsu |
| 2011/0227820 A1 | 9/2011 | Haddick et al. |
| 2011/0254834 A1 | 10/2011 | Jeon et al. |
| 2011/0273365 A1 | 11/2011 | West et al. |
| 2011/0273662 A1 | 11/2011 | Hwang et al. |
| 2012/0007800 A1 | 1/2012 | Jaroslaw |
| 2012/0033061 A1 | 2/2012 | Ko et al. |
| 2012/0050503 A1 | 3/2012 | Kraft |
| 2012/0059464 A1* | 3/2012 | Zhao ................. A61F 2/1654 623/6.28 |
| 2012/0069131 A1 | 3/2012 | Abelow |
| 2012/0084652 A1 | 4/2012 | Martinez Bauza et al. |
| 2012/0086917 A1 | 4/2012 | Okuda et al. |
| 2012/0105310 A1 | 5/2012 | Sverdrup et al. |
| 2012/0105740 A1 | 5/2012 | Jannard et al. |
| 2012/0120498 A1* | 5/2012 | Harrison ................. G02B 3/08 359/630 |
| 2012/0127062 A1 | 5/2012 | Bar-Zeev et al. |
| 2012/0195454 A1 | 8/2012 | Nishihara et al. |
| 2012/0212398 A1 | 8/2012 | Border et al. |
| 2012/0236030 A1 | 9/2012 | Border et al. |
| 2012/0244812 A1 | 9/2012 | Rosener |
| 2012/0262477 A1 | 10/2012 | Buchheit |
| 2012/0262549 A1 | 10/2012 | Ferguson |
| 2012/0262562 A1 | 10/2012 | Fukutake et al. |
| 2012/0280941 A1 | 11/2012 | Hu |
| 2012/0307357 A1 | 12/2012 | Choi et al. |
| 2013/0002660 A1 | 1/2013 | Chikazawa |
| 2013/0010055 A1 | 1/2013 | Raju et al. |
| 2013/0044939 A1 | 2/2013 | Li |
| 2013/0057961 A1 | 3/2013 | Evans et al. |
| 2013/0120265 A1 | 5/2013 | Horii et al. |
| 2013/0127980 A1* | 5/2013 | Haddick ................. G06F 3/013 348/14.08 |
| 2013/0147791 A1 | 6/2013 | Gilberton et al. |
| 2013/0160039 A1 | 6/2013 | Mentz et al. |
| 2013/0182086 A1 | 7/2013 | Evans et al. |
| 2013/0194244 A1 | 8/2013 | Tamir |
| 2013/0201080 A1 | 8/2013 | Evans et al. |
| 2013/0258463 A1 | 10/2013 | Evans et al. |
| 2013/0278631 A1* | 10/2013 | Border ................. G02B 27/017 345/633 |
| 2013/0293531 A1 | 11/2013 | Cao et al. |
| 2013/0307842 A1 | 11/2013 | Grinberg et al. |
| 2013/0314303 A1 | 11/2013 | Osterhout et al. |
| 2013/0314615 A1 | 11/2013 | Allen et al. |
| 2013/0342904 A1 | 12/2013 | Richards |
| 2014/0043320 A1* | 2/2014 | Tosaya ................. G02B 27/0172 345/419 |
| 2014/0063055 A1* | 3/2014 | Osterhout ................. G06F 3/005 345/633 |
| 2014/0139652 A1 | 5/2014 | Aiden et al. |
| 2014/0139927 A1 | 5/2014 | Hiraide |
| 2014/0200079 A1 | 7/2014 | Bathiche et al. |
| 2014/0253698 A1 | 9/2014 | Evans et al. |
| 2015/0028755 A1 | 1/2015 | Chang et al. |
| 2015/0060811 A1 | 3/2015 | Shiratori |
| 2015/0091781 A1 | 4/2015 | Yu et al. |
| 2015/0097759 A1 | 4/2015 | Evans et al. |
| 2015/0103152 A1 | 4/2015 | Qin |
| 2015/0331246 A1 | 11/2015 | Dewald et al. |
| 2016/0018639 A1 | 1/2016 | Spitzer et al. |
| 2016/0033771 A1* | 2/2016 | Tremblay ................. G02B 27/0172 345/8 |
| 2016/0195718 A1 | 7/2016 | Evans |
| 2016/0198133 A1 | 7/2016 | Evans |
| 2016/0292921 A1 | 10/2016 | Evans et al. |
| 2016/0295202 A1 | 10/2016 | Evans et al. |
| 2017/0068311 A1 | 3/2017 | Evans et al. |
| 2017/0139209 A9 | 5/2017 | Evans et al. |

FOREIGN PATENT DOCUMENTS

| | | |
|---|---|---|
| JP | 2012253471 | 12/2012 |
| WO | 2008070683 A1 | 6/2008 |
| WO | 2011097226 A1 | 8/2011 |
| WO | 2011137034 A1 | 11/2011 |
| WO | 2012000457 A1 | 1/2012 |
| WO | 2012098534 A1 | 7/2012 |
| WO | 2013012259 A2 | 1/2013 |

OTHER PUBLICATIONS

NPL—Chapter 2—Principles of Stereoscopic Depth Perception and Reproduction, 2007.
PCT/US14/023799, International Preliminary Report on Patentability, Mailing Date Jul. 21, 2014, 6 pages.
PCT/US14/23799, International Search Report, Date of mailing Jul. 21, 2014, 2 pages.
PCT/USI4/59579 International Search Report, Date of mailing Jan. 5, 2015, 1 pages.
PCT/US2014/059579 International Preliminary Report on Patentability, Issued on Apr. 12, 2016, 6 pages.
PCT/US2015/010372 International Preliminary Report on Patentability, Issued on Jul. 12, 2016, 6 pages.
PCT/US2015/010372 International Search Report, Mailed on Apr. 21, 2015, 2 pages.
PCT/US2015/010377 International Search Report, Mailed Apr. 28, 2015, 2 pages.
PCT/US2015/010377 International Preliminary Report on Patentability, Issued on Jul. 12, 2016, 6 pages.
PCT/US2015/031649 International Search Report, Mailed on Nov. 24, 2015, 3 pages.
PCT/US2015/031649 Written Opinion of the International Searching Authority, Mailed on Nov. 24, 2015, 6 pages.
PCT/YS2015/010380 International Preliminary Report on Patentability, Issued Jul. 12, 2016, 7 pages.
PCT/YS2015/010380 International Search Report, Date of mailing Apr. 22, 2015, 2 pages.
Qian, Ning, "Binocular Disparity and the Perception of Depth", Neuron, vol. 18, Mar. 1997, 359-368.
Rainbow Symphony, Pulfrich 3D Glasses, <http://www.3dglasses.net/Pulfrich%203D%20Glasses.htm>, Retrieved on Jan. 27, 2016, 2 pages.
Ruxandra Serbanescu, "Polarization of light", 2009.
Bertolami, "De-3D: Watch 3D Movies in Comfortable 2D.", Oct. 2, 2010, 4 pages.
Fateh Sina et al: "Rebalancing the Visual System of People with Amblyopia "Lazy Eye" by Using Hmd and Image Enhancement", Jul. 19, 2009, Network and Parallel Computing; [Lecture Notes in Computer Science; Lect.Notes Computer], Springer International Publishing, Cham, pp. 560-565, XP047355900.
Flacy, Mike. "Vending Machines Stocked with $70 3d Glasses Added to Theaters.", Aug. 11, 2011, 3 pages.

* cited by examiner

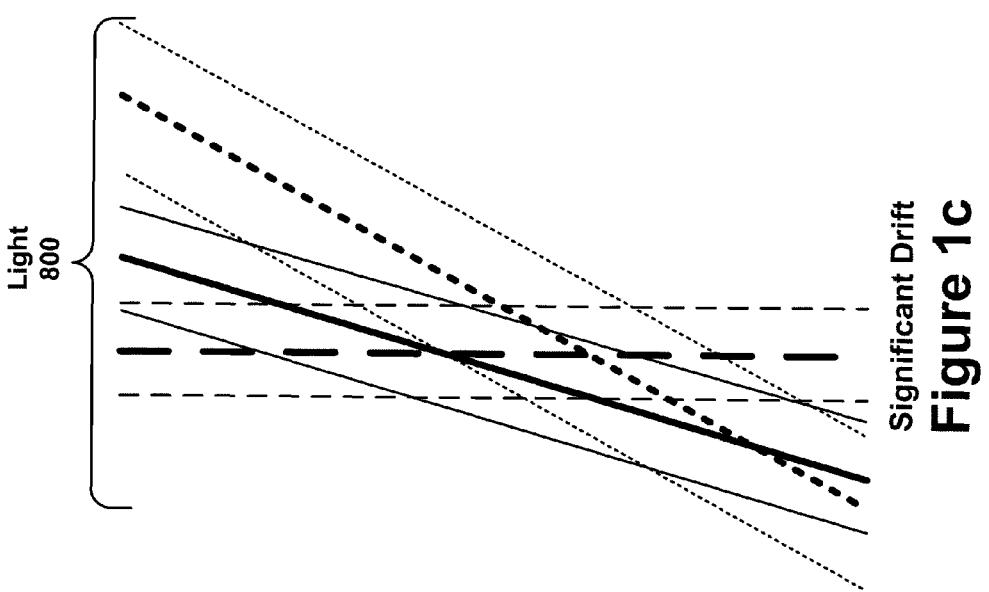
Figure 1c Significant Drift
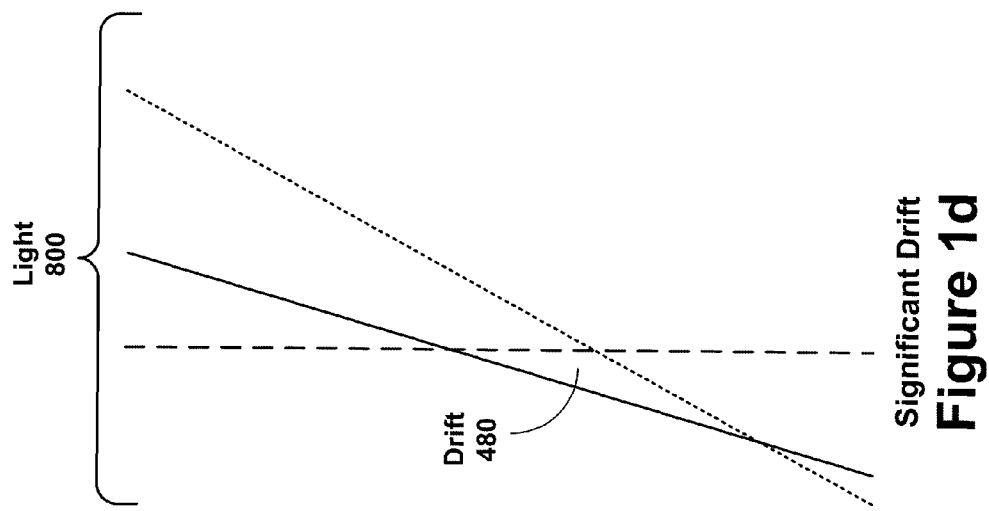
Figure 1d Significant Drift
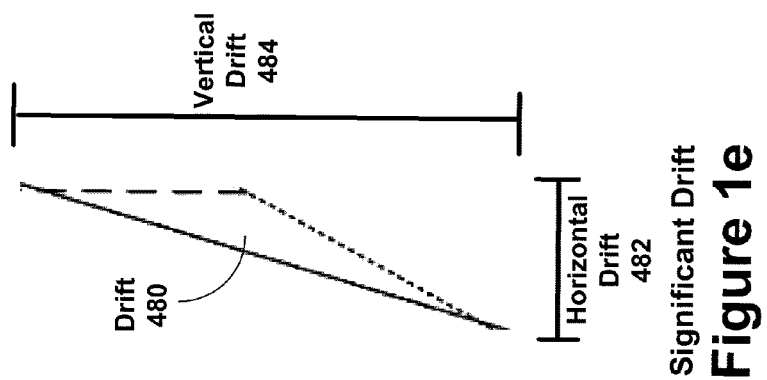
Figure 1e Significant Drift Minimal Drift Minimal Drift Minimal Drift

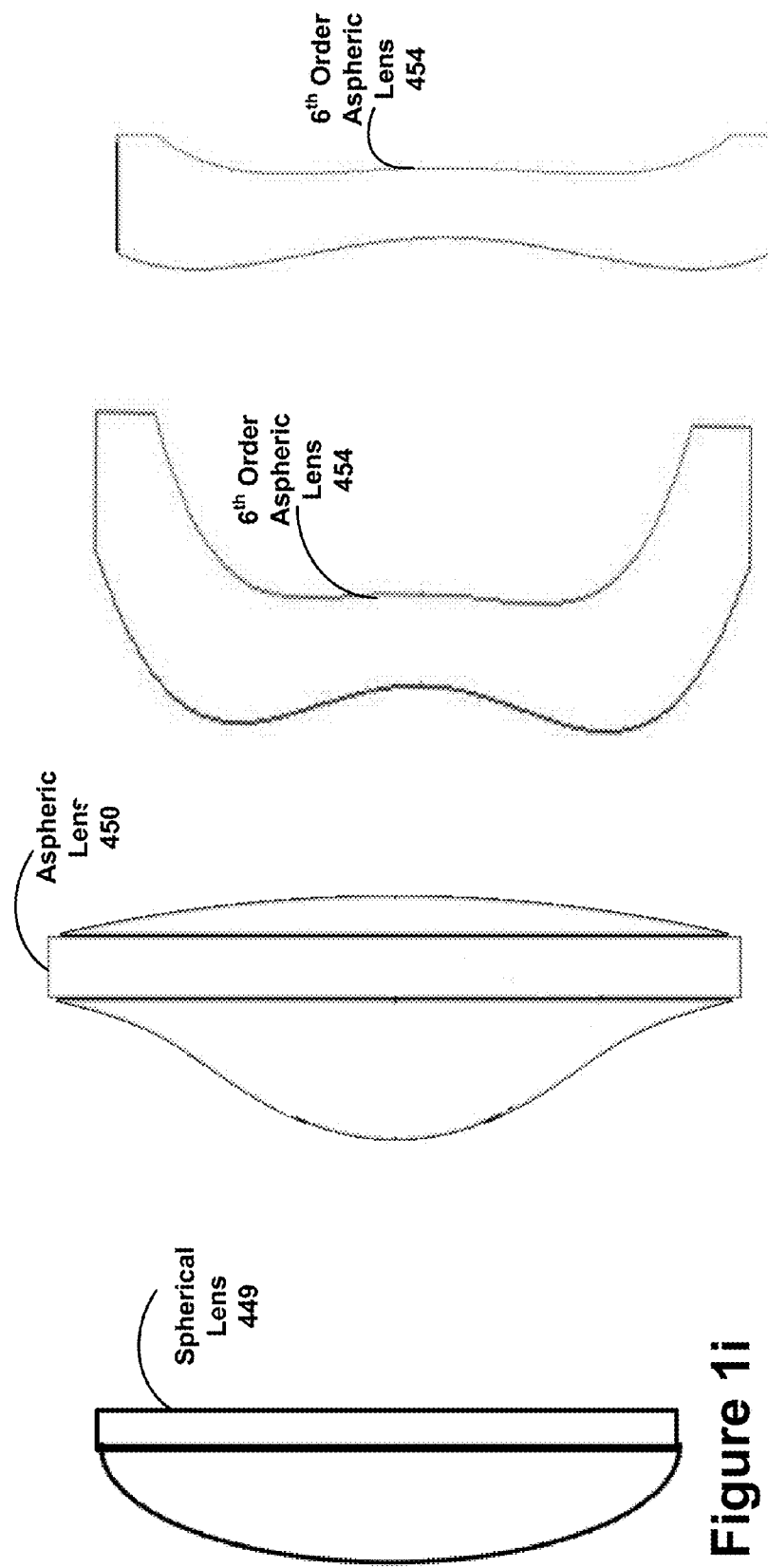

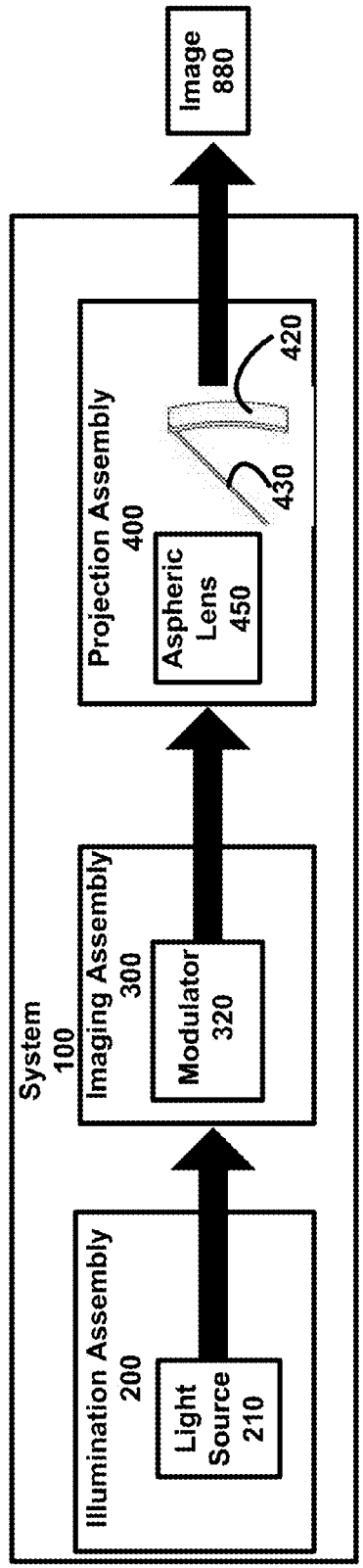
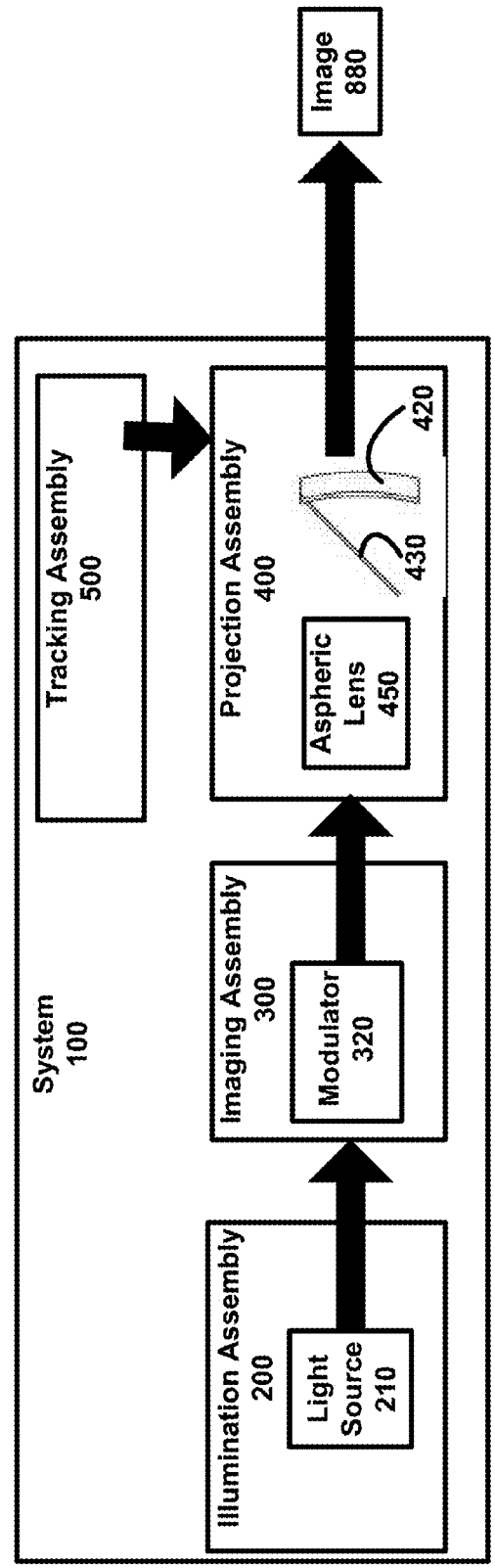

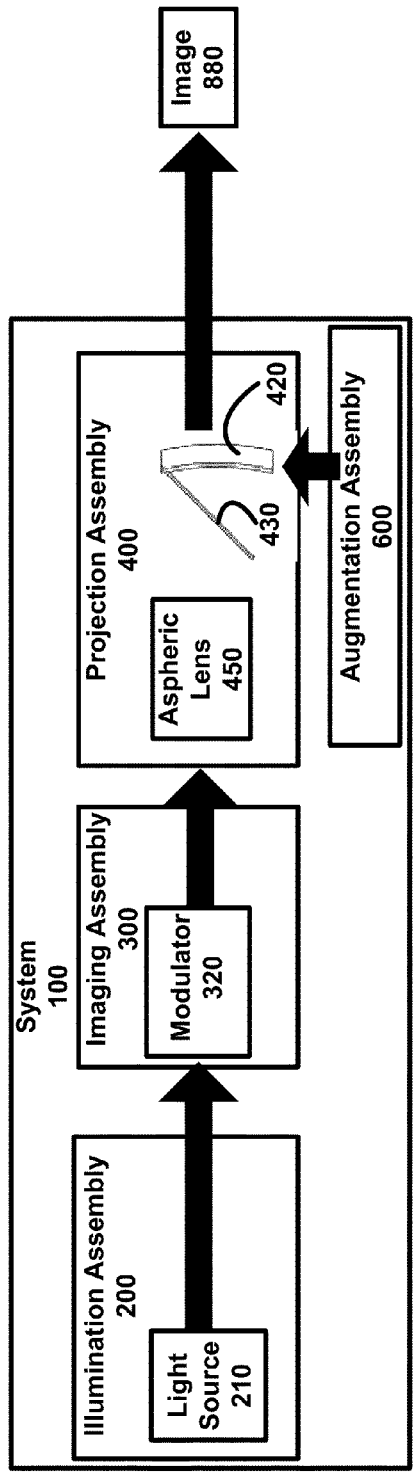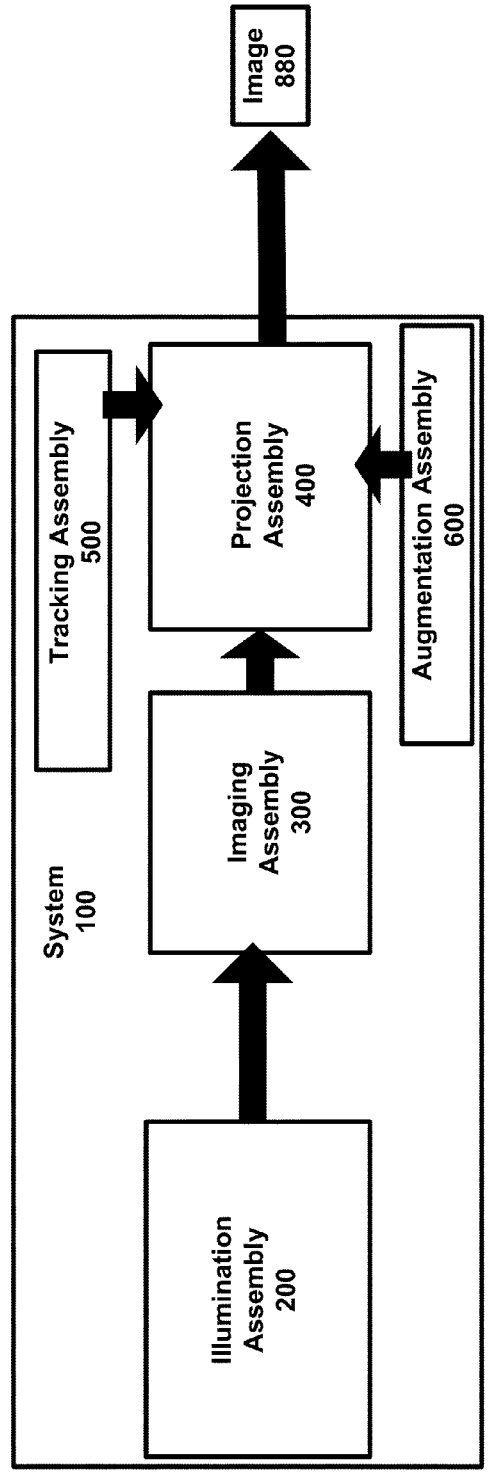
Figure 2c
Figure 2d

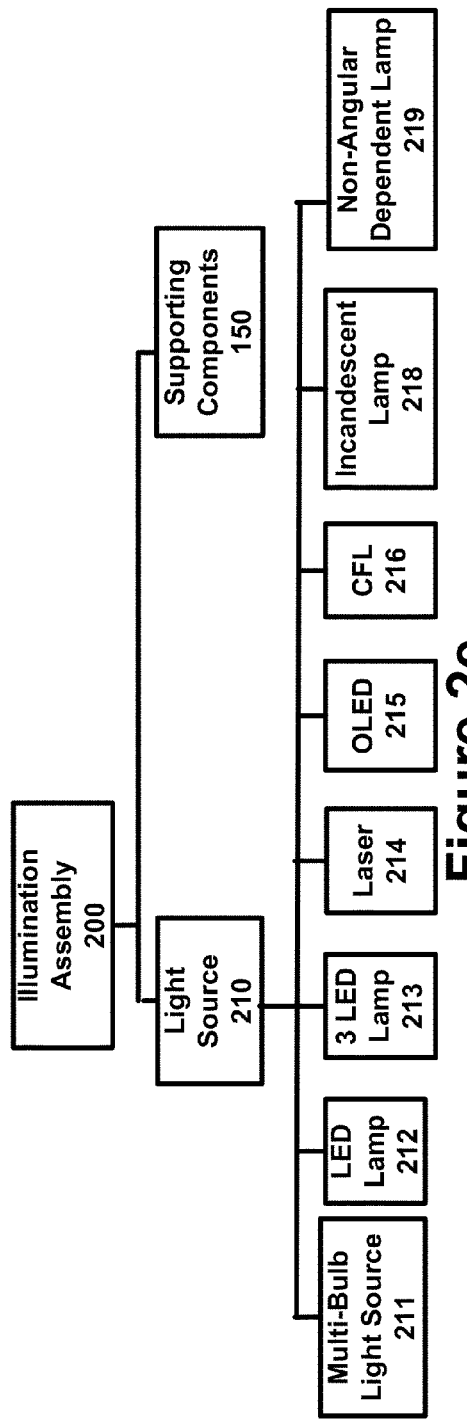
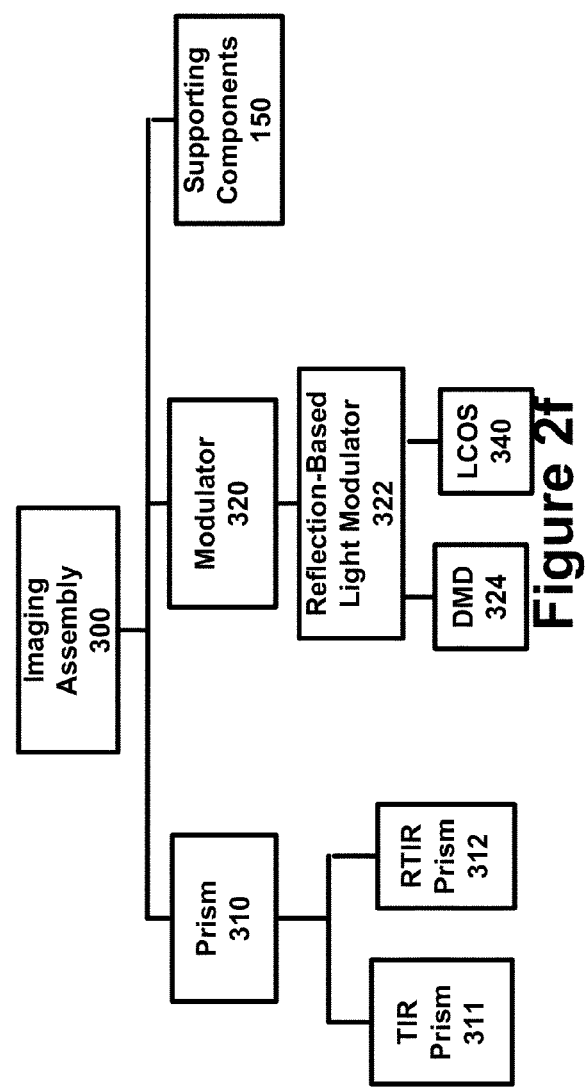
Figure 2e
Figure 2f

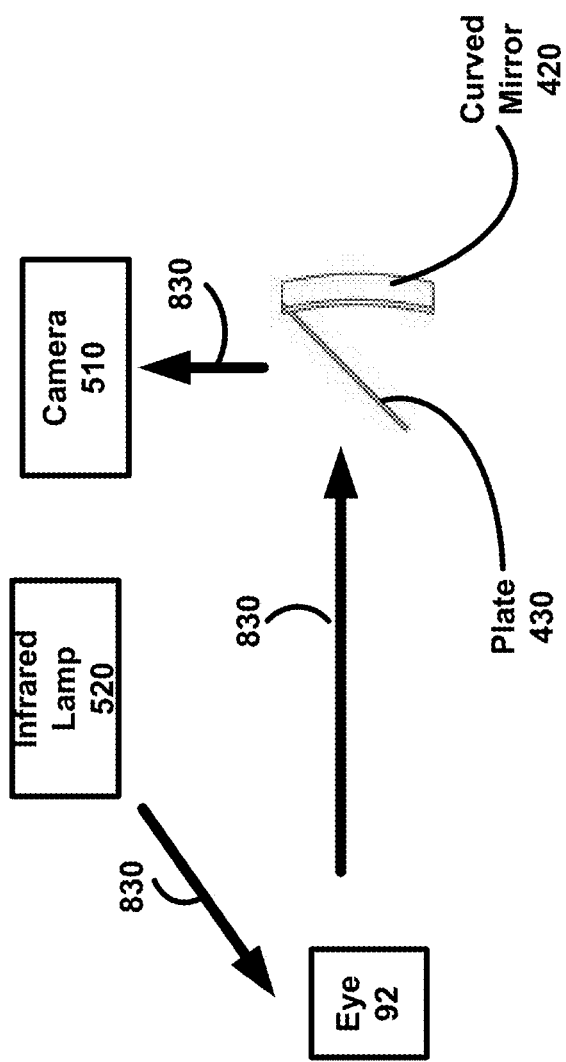

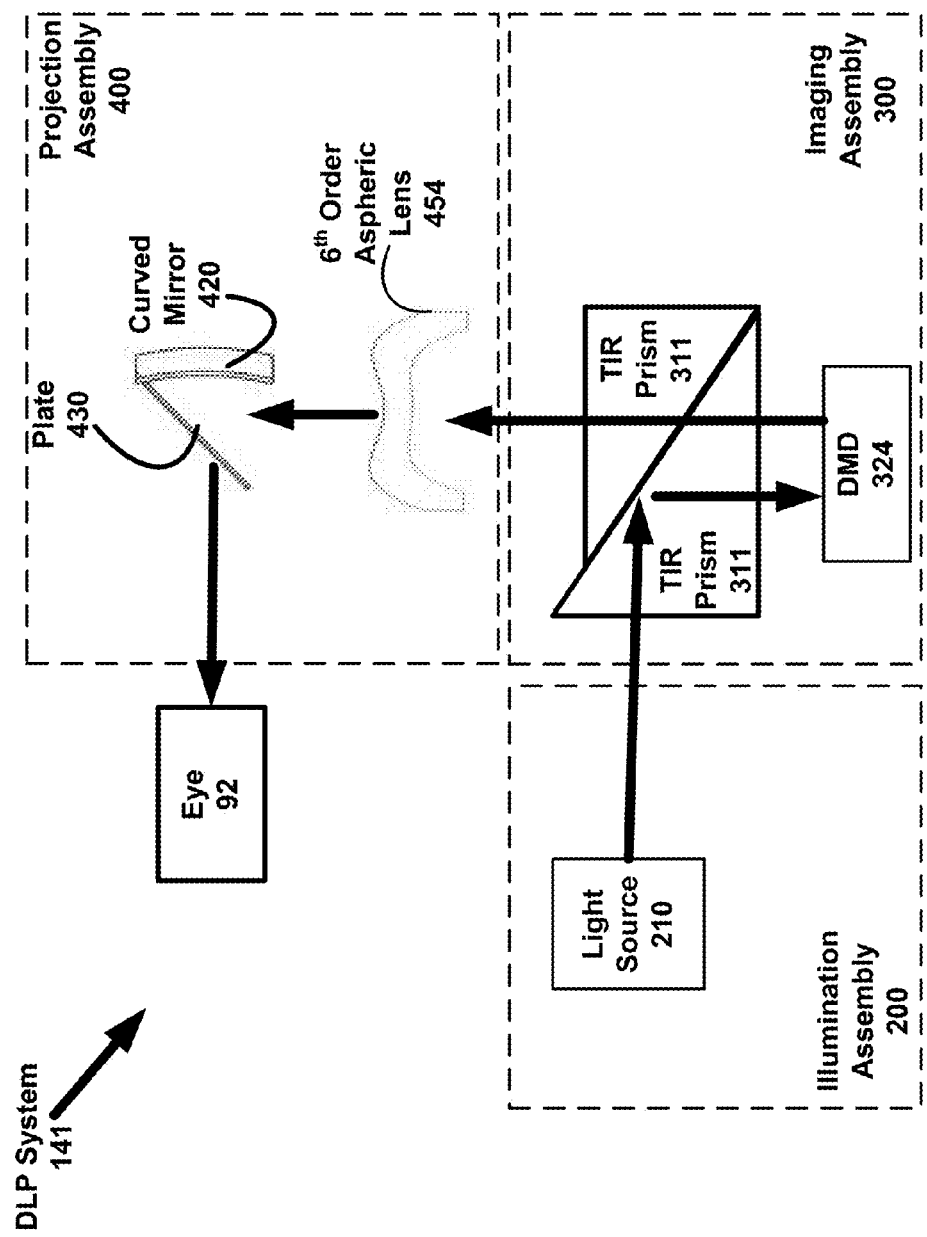

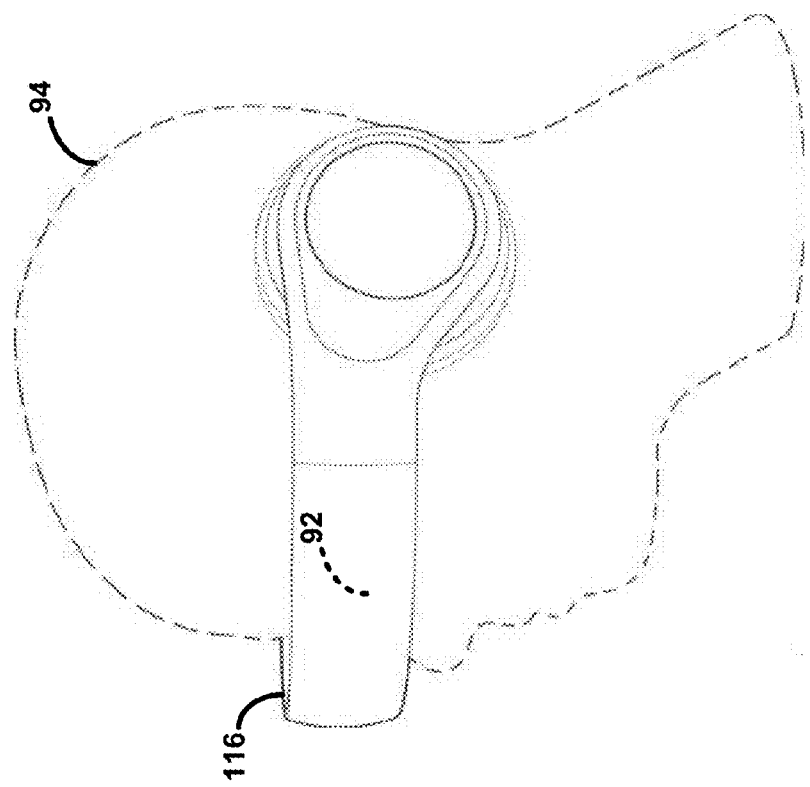
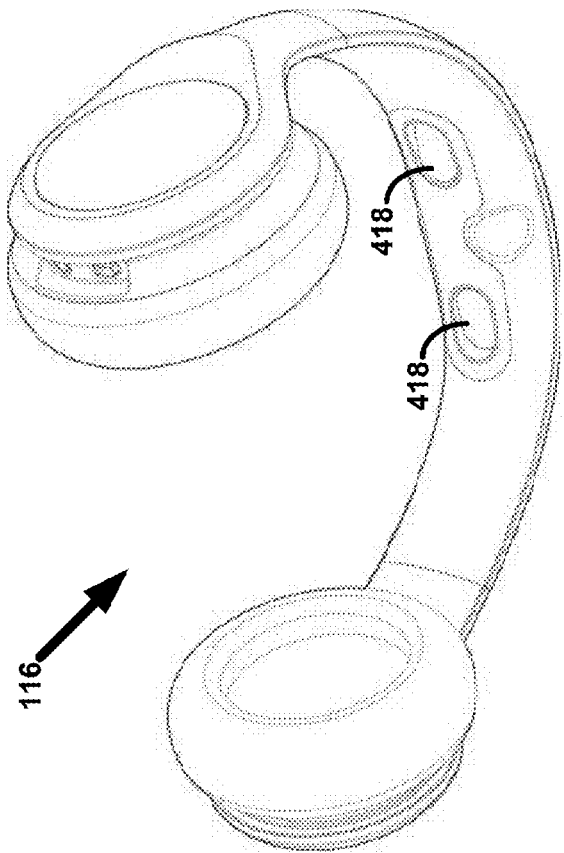
Figure 4b
Figure 4a

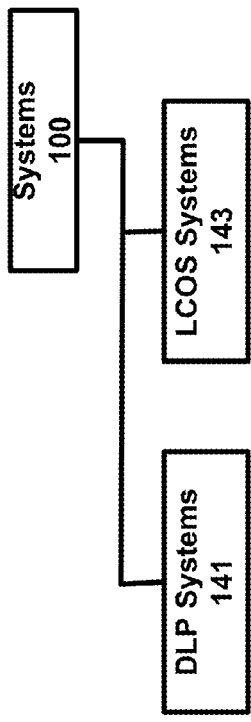
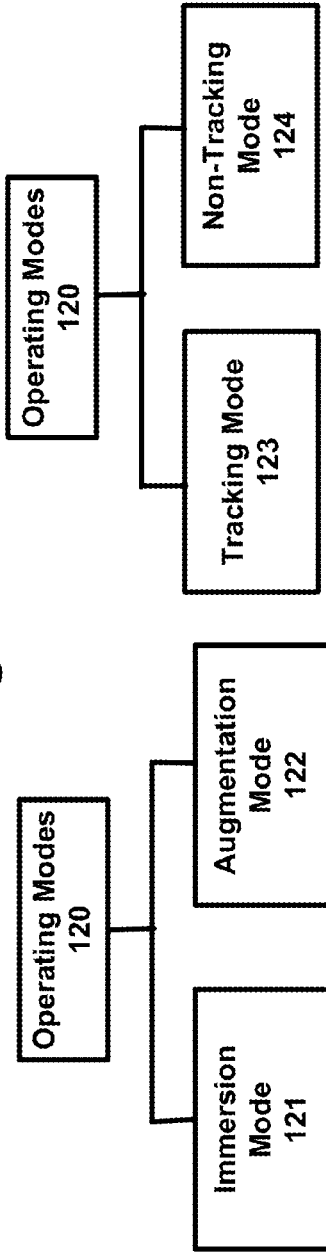
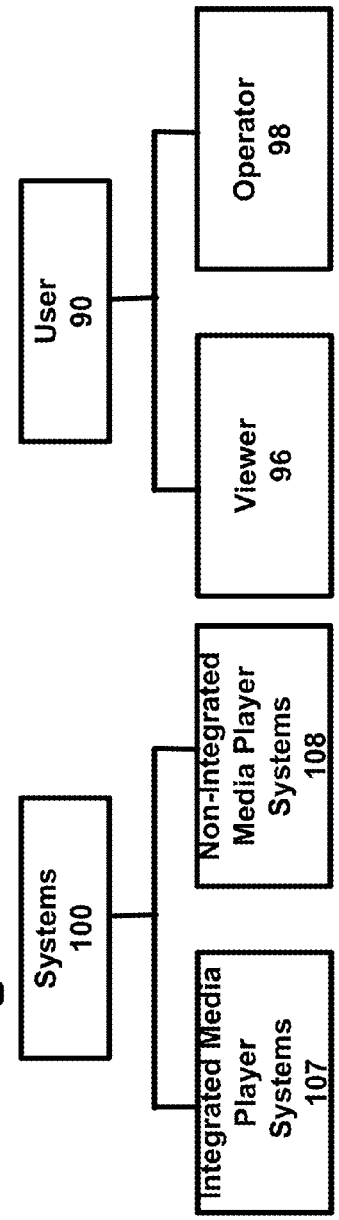

SYSTEM, APPARATUS, AND METHOD FOR DISPLAYING AN IMAGE WITH A WIDER FIELD OF VIEW

BACKGROUND OF THE INVENTION

The invention is system, apparatus, and method (collectively the "system") for displaying an image. More specifically, the system can effectively display an image with a wider field of view ("FOV") to a user.

Image display technologies allow a human being to perceive an artificially created image, such as the image on a smart phone, tablet computer, television, arcade game screen, computer monitor, movie screen, or other similar devices. Such technologies can involve active screens, such as a visual display on a smart phone, or passive displays, such as a screen at a movie theater onto which images are projected onto. Some displays are large and far away like a scoreboard as a sports stadium while other displays may be small and close by such as viewing an image through an eye-piece or other form or near-eye display. Some displays can be positioned very close to the eyes of the viewer such as virtual reality goggles or virtual retinal displays worn on the head of the viewer which project an image directly onto the retina of the viewer.

Regardless of the specific process for creating and directing an image to a human viewer, the process for artificially creating an image that is visually perceived by a viewer is different in many respects from the process by which a human being visually perceives the real world. The real world is by default a 360° world. In the real world, light forming different portions of the viewer's field of view ("FOV") can originate from different places, travelling substantially different paths, and even benefiting from different light sources. In an image display device, light is modulated to give the appearance of a field of view. The wider the FOV, the more challenging it can be to provide such an image in a realistic and effective manner. The challenges can be even more pronounced in the context of near-eye displays such as displays involving eye pieces or head-mounted image display devices.

I. The "Exit Pupil" of an Optical System such as an Image Display Device

The "exit pupil" is a term of art in the field of optics. It does not pertain to human eye. The exit pupil is sometimes referred to as the "eyepoint" or the "ramsden circle". The exit pupil is the portion of a beam of light where the cross-section is the smallest. The exit pupil is a "virtual aperture" in an optical system. Only rays of light within the exit pupil can be perceived by the human viewer, and such perception is dependent on a sufficient alignment between the exit pupil of the device and the entrance pupil of the human eye.

II. Drift or Displacement in the Exit Pupil

As illustrated in FIG. 1b, in an idealized description of optics, the exit pupil is located a single point. In practical applications. In the real world devices there is some measure of displacement or drift. That displacement is often referred to as "exit pupil drift", "optic drift" or simply "displacement" or "drift". The exit pupil drift of tends to increase as the FOV increases, and as the device itself is reduced in size. Thus, exit pupil drift is particularly problem in a near-eye display such as an eye-piece based device or a head-mounted display such as virtual reality goggles. FIGS. 1c-1e illustrate examples of exit pupil drift that would result loss of color and intensity within different areas of the FOV. In contrast, FIGS. 1f-1h illustrate examples of exit pupil drift that will have minimal if any impact on the user experience with the image display device.

Different image display technologies can make it relatively easier or harder to provide an image with a relatively more expanded field of view. For example, it is well known that plasma TVs have a substantially wider viewing angle than LCD TVs. Although manufacturers of such TVs may assert a viewing angle of 178°, at least one independent reviewer of LED TVs in 2014 found effective viewing angles of between 36° and 74°. Unlike light in the real world which originates from a variety of sources, travels a variety of paths, and approaches the eye from a variety of angles, the light from a television set originates from substantially the same place, travels substantially the same path, and approaches the eye from substantially the same angle.

If the exit pupil drift in a displayed image is too substantial, it becomes impossible to properly align the exit pupil with the entrance pupil, i.e. the pupil in the eye of the viewer.

III. Alignment Between the Exit Pupil and the Entrance Pupil

Anyone who has struggled to view an image through an eyepiece can understand the importance of an exit pupil that is properly aligned with the entrance pupil, i.e. the pupil of the human eye viewing the displayed image. This properly couples the display device to the eye and avoids "vignetting" which is a reduction in the brightness or color of an image on the periphery when compared to the image center.

Maintaining a proper alignment between the exit pupil of the device and the entrance pupil of the eye can be particularly challenging in the context of head-mounted display device because of the movement of the eye of the viewer. Substantial exit pupil drift makes it that much harder for the viewer of the image to sustain that alignment. Head-mounted display devices such as a VRD visor apparatus are intended to allow the eye to move and focus on different areas within the displayed image.

IV. Image Display Devices are Far More Limiting than the Human Eye

In terms of field of view, many image display devices are far more limiting than the inherent capabilities of the human eye. The field of view of a typical human eye is approximately 95° outwards from the nose, 75° in a downwards direction, 60° inwards towards the nose, and 60° upwards. Human beings have an almost 180° forward-facing horizontal field of view. Eyeball rotation can expand the horizontal field of view to almost as high as 270°.

All of the numbers referenced above represent the maximum capabilities of a typical human eye viewing images in the real world.

The world of image display devices is far more limiting. Some television sets provide an effective horizontal FOV of less than 45°. Near eye displays such as eye-piece based devices and head-mounted displays involve substantial exit pupil drift at about 40° or greater.

V. How the Eye Works

The outer surface of a human eye is the cornea. Light enters the eye through the cornea, which protects the interior portions of the eye while allowing light to enter the eye so that it can be seen. The cornea provides most of the focusing power of the eye, but that focus is fixed and cannot be adjusted by the cornea. The cornea possesses a curved and transparent surface. The cornea is typically about 8 mm in radius.

Light then passes from the cornea through the pupil, an adjustable opening in the center of the iris, which is the colored portion of the eye. Movement of the pupil (and iris) allows a human being to focus attention at different areas within the field of view. The pupil can also expand or contract to control the amount of light that passes through the pupil. Normal pupil size is typically between 2.0 mm and 5.0 mm.

The pupil of a human eye is small for the purposes of alignment with the exit pupil of an optical system. If properly aligned with the human eye, an image display device could create a more expansive FOV that could be effectively experienced by the viewer. However, the entrance pupil of the human eye is small, and a material magnitude of exit pupil drift renders prior art attempts at an expanded FOV undesirable for most viewers.

SUMMARY OF THE INVENTION

The invention is system, apparatus, and method (collectively the "system") for displaying an image. More specifically, the system can effectively display an image with a wider field of view ("FOV") to a user.

The system uses an aspherical lens to reduce the pupil drift. The reduction in pupil drift supports a wider FOV. Prior art attempts at providing a wider FOV suffer from the negative image effects of material exit pupil drift. Such drift makes the resulting image unrealistic and distorted.

BRIEF DESCRIPTION OF THE DRAWINGS

The invention is system, apparatus, and method (collectively the "system") for displaying an image. More specifically, the system can effectively display an image with a wider field of view ("FOV") to a user.

Many features and inventive aspects of the system are illustrated in the various drawings described briefly below. However, no patent application can expressly disclose in words or in drawings, all of the potential embodiments of an invention. Variations of known equivalents are implicitly included. In accordance with the provisions of the patent statutes, the principles, functions, and modes of operation of the systems, apparatuses, and methods (collectively the "system") are explained and illustrated in certain preferred embodiments. However, it must be understood that the inventive systems may be practiced otherwise than is specifically explained and illustrated without departing from its spirit or scope.

Figure 1B:
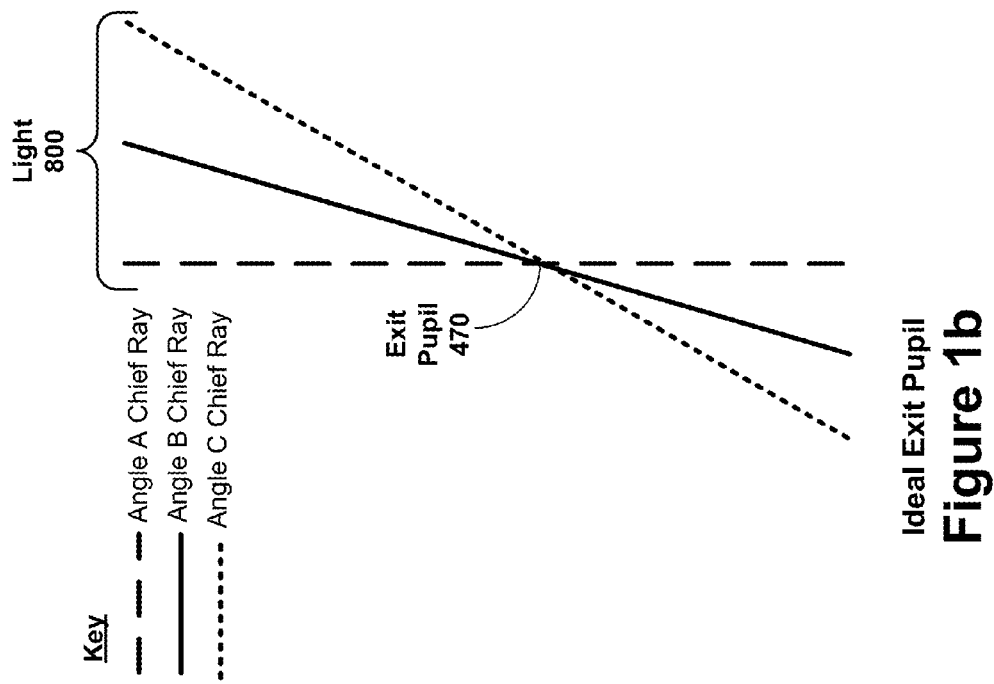

All components illustrated and associated with element numbers in the drawings described below are named and described in Table 1 provided in the Detailed Description section.

Figure 1A:
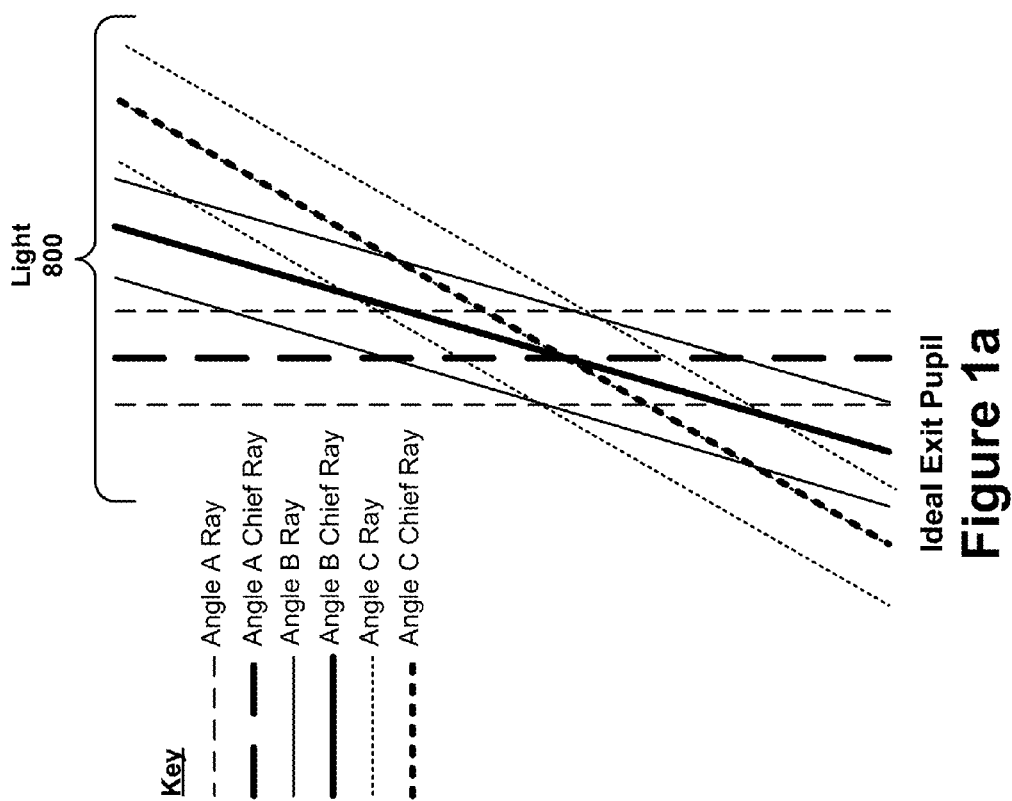

FIG. 1a is a light ray diagram illustrating an idealized display of an image comprised of light. All of the chief rays of light converge at a single point, the exit pupil.

FIG. 1b is a light ray diagram illustrating a more simplified view of FIG. 1a where only the chief rays are illustrated. All the chief rays converge at a single point, the exit pupil.

FIG. 1c is a light ray diagram illustrating an example of a displayed image that is hampered by significant exit pupil drift. As illustrated in the figure, there is substantial displacement between the chief rays. FIG. 1c (significant displacement) is offered for comparison purposes with FIG. 1a (no displacement) and FIG. 1f (minimal displacement).

FIG. 1d is a light ray diagram illustrating a more simplified view of FIG. 1c where only the chief rays are illustrated. There is substantial drift illustrated in the figure. FIG. 1d (significant displacement) is offered for comparison purposes with FIG. 1b (no displacement) and FIG. 1g (minimal displacement).

FIG. 1e is a diagram illustrating an example of a close-up view of the exit pupil drift illustrated in FIG. 1d. FIG. 1e (substantial displacement) is offered for comparison purposes with FIG. 1h (minimal displacement).

Figure 1H:
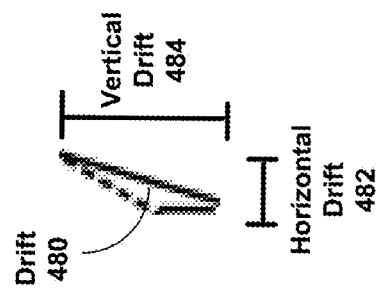
Figure 1G:
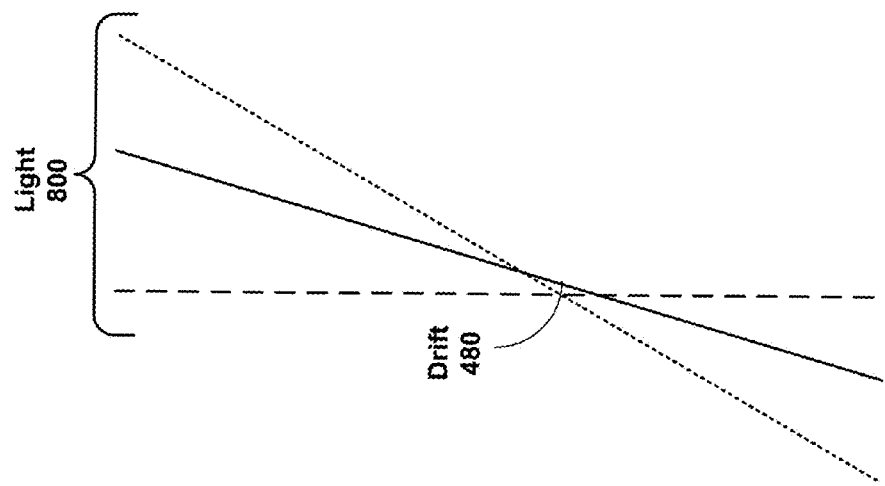
Figure 1F:
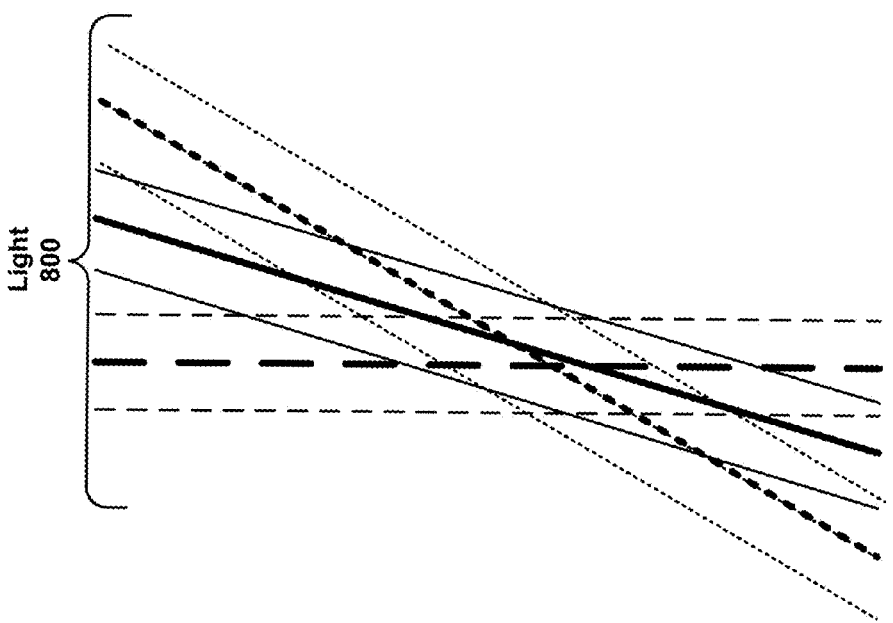

FIG. 1f is a light ray diagram illustrating an example of a displayed image that with minimal exit pupil drift. FIG. 1f (minimal displacement) is offered for comparison purposes with FIG. 1a (no displacement) and FIG. 1c (substantial displacement).

FIG. 1g is a light ray diagram illustrating a more simplified view of FIG. 1f where only the chief rays are illustrated. There is minimal drift illustrated in the figure. FIG. 1g (minimal displacement) is offered for comparison purposes with FIG. 1d (significant displacement) and FIG. 1b (no displacement).

FIG. 1h is a diagram illustrating an example of a close-up view of the exit pupil draft illustrated in FIG. 1g. FIG. 1h (minimal displacement) is offered for comparison purposes with FIG. 1e (substantial displacement).

FIG. 1i is a diagram illustrating an example of a spherical lens.

FIG. 1j is a diagram illustrating an example of an aspheric lens.

FIG. 1k is a diagram illustrating an example of a top view of a $6^{th}$ order aspheric lens.

FIG. 1l is a diagram illustrating an example of a cross section view of a $6^{th}$ order aspheric lens.

Figure 1N:
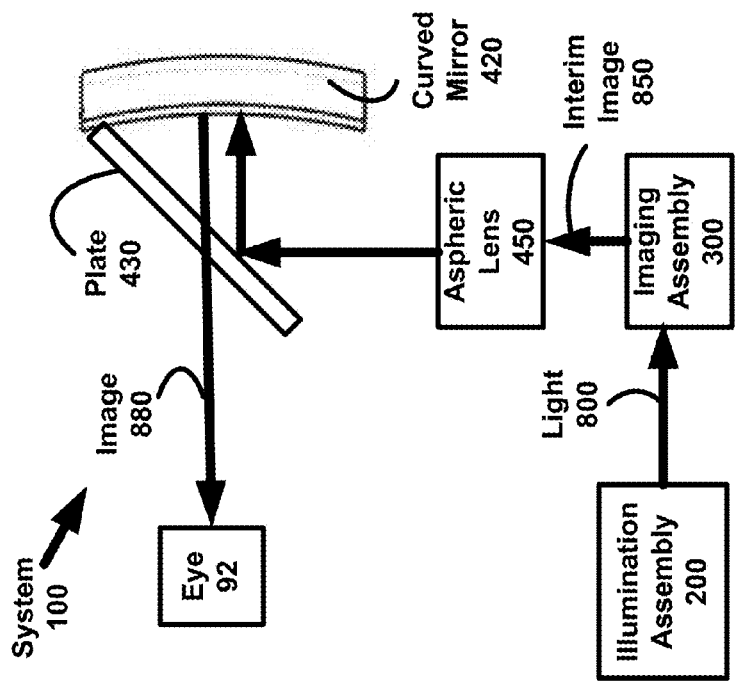
Figure 1M:
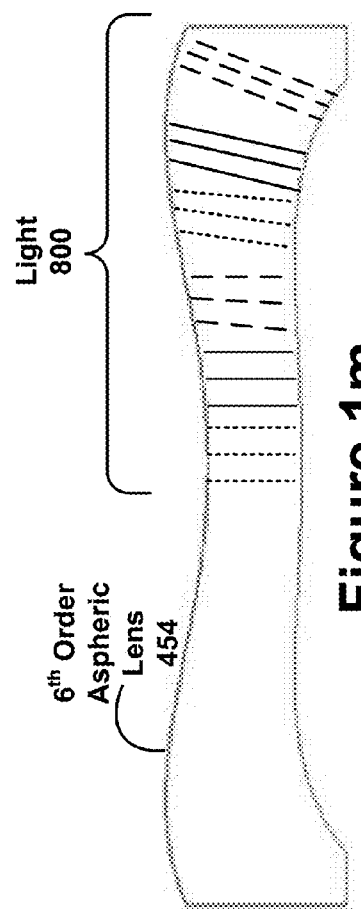

FIG. 1m is a diagram illustrating an example of how light rays travel through a $6^{th}$ order aspheric lens at different angles.

FIG. 1n is a block diagram illustrating an example of a pathway of light beginning with its generation by a light assembly and ending in the display of an image to the eye of a viewer.

Figure 1O:
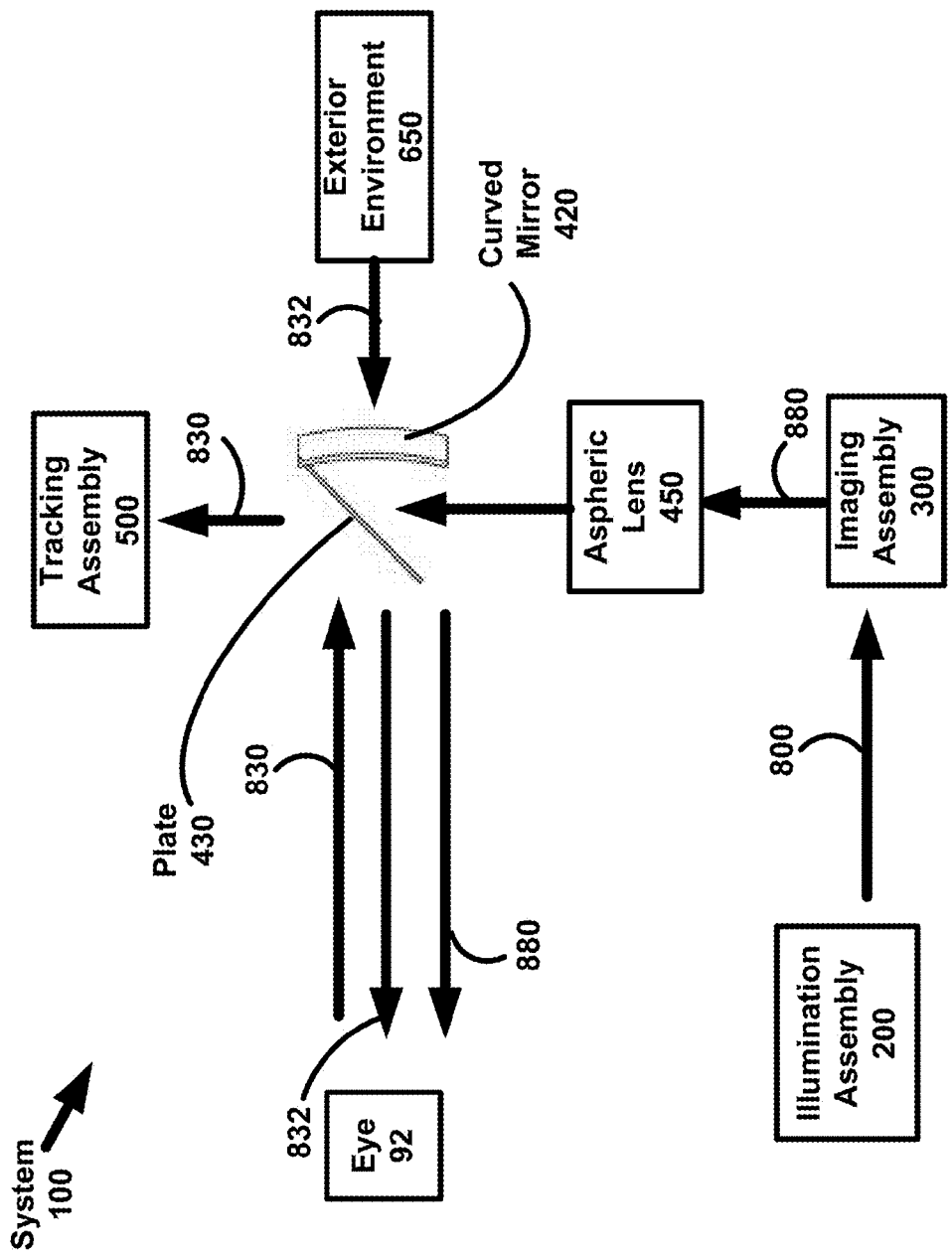

FIG. 1o is a block diagram illustrating an example of the system illustrated in FIG. 1n, further including light from the exterior environment to support an augmentation mode and light from a tracking assembly to track the eye movements of the viewer.

Figure 1P:
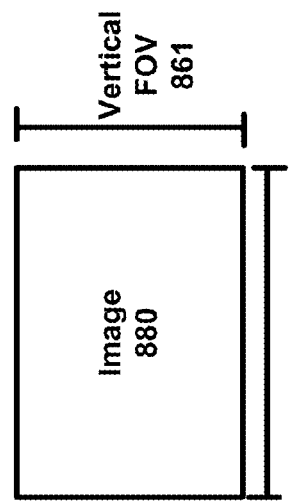

FIG. 1p is a front view diagram illustrating an example of a plate-curved mirror configuration that would face the eye of a user.

Figure 1Q:
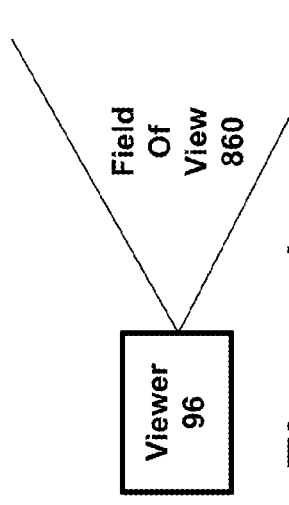

FIG. 1q is a block diagram illustrating a view experiencing a field of view ("FOV").

Figure 1R:
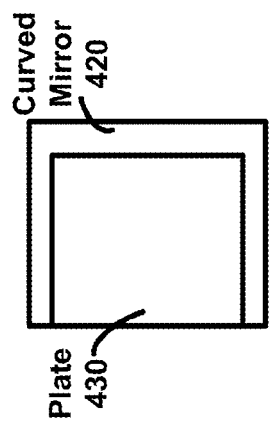

FIG. 1r is a lock diagram illustrating an example of image within a vertical FOV and a horizontal FOV.

Figure 1S:
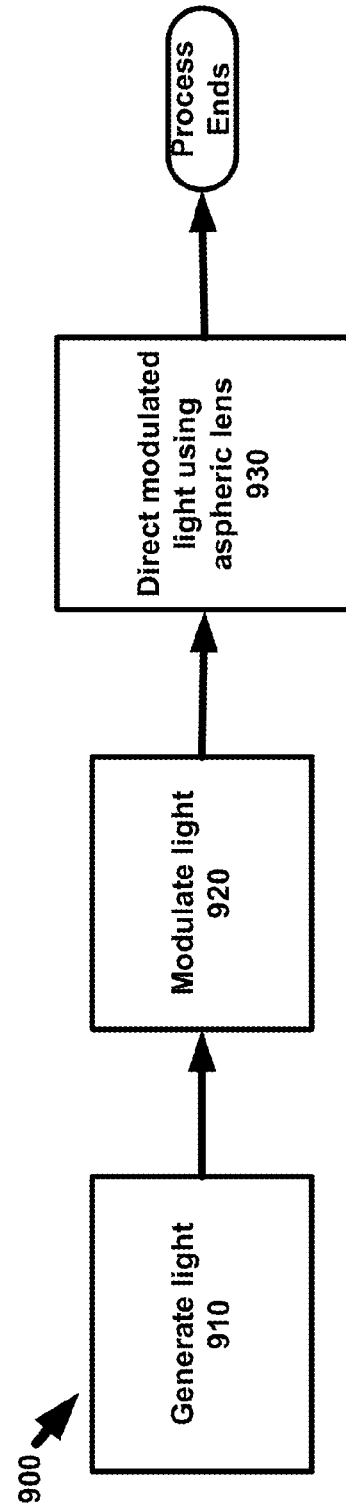

FIG. 1s is a flow chart diagram illustrating an example of a process for displaying an image that utilizes an aspheric lens to direct the light used in the image displayed to the user.

FIG. 2a is a block diagram illustrating an example of different assemblies that can be present in the operation of the system, such as an illumination assembly, an imaging assembly, and a projection assembly.

FIG. 2b is a block diagram illustrating an example of a configuration that includes an optional tracking assembly.

FIG. 2c is a block diagram illustrating an example of a configuration that includes an optional augmentation assembly.

FIG. 2d is a block diagram illustrating an example of a configuration that includes both an optional tracking assembly and an optional augmentation assembly.

FIG. 2e is a hierarchy diagram illustrating an example of different components that can be included in an illumination assembly.

FIG. 2*f* is a hierarchy diagram illustrating an example of different components that can be included in an imaging assembly.

Figure 2H:
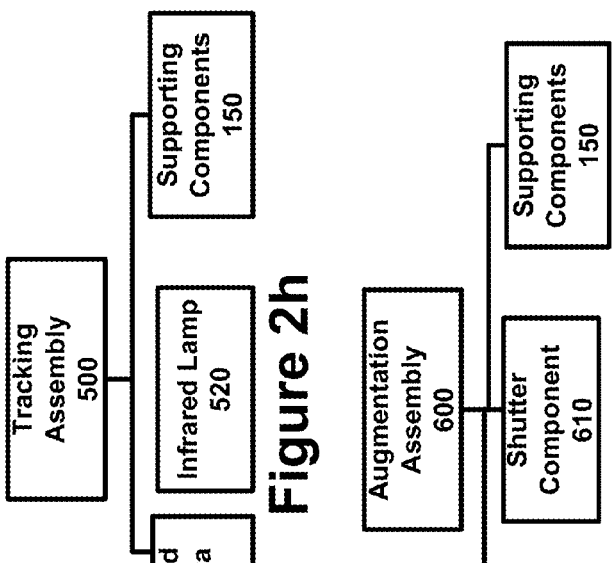
Figure 2I:
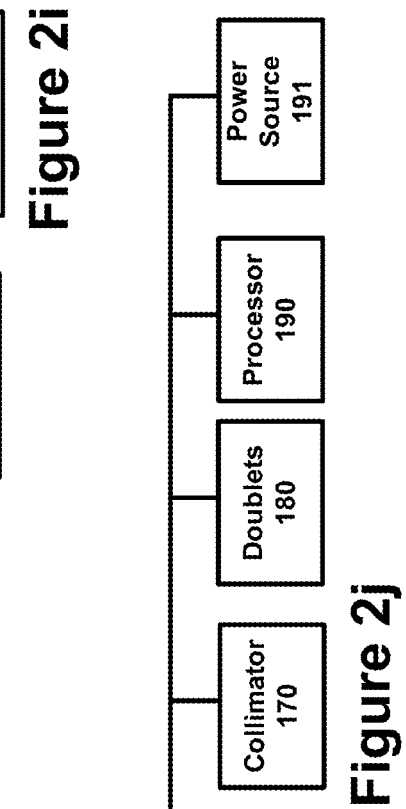
Figure 2G:
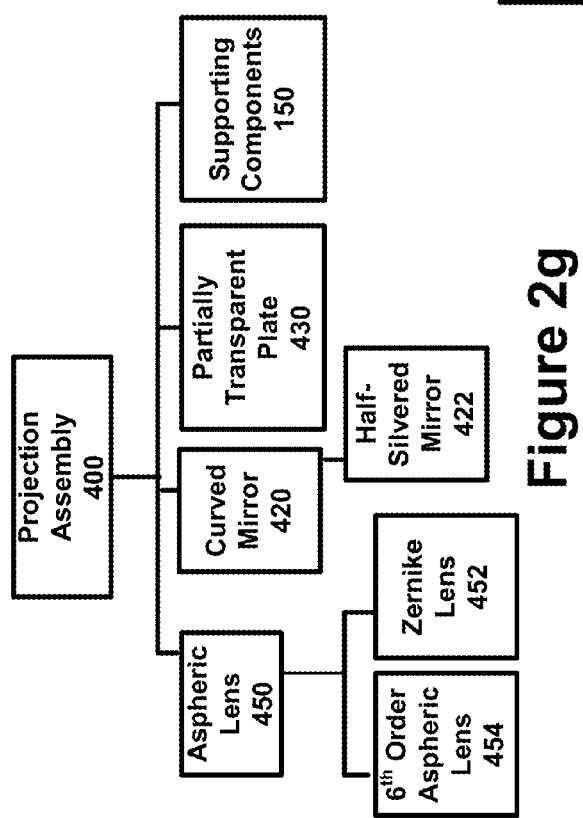

FIG. 2*g* is a hierarchy diagram illustrating an example of different components that can be included in a projection assembly.

FIG. 2*h* is a hierarchy diagram illustrating an example of different components that can be included in a tracking assembly.

FIG. 2*i* is a hierarchy diagram illustrating an example of different components that can be included in an augmentation assembly.

Figure 2J:
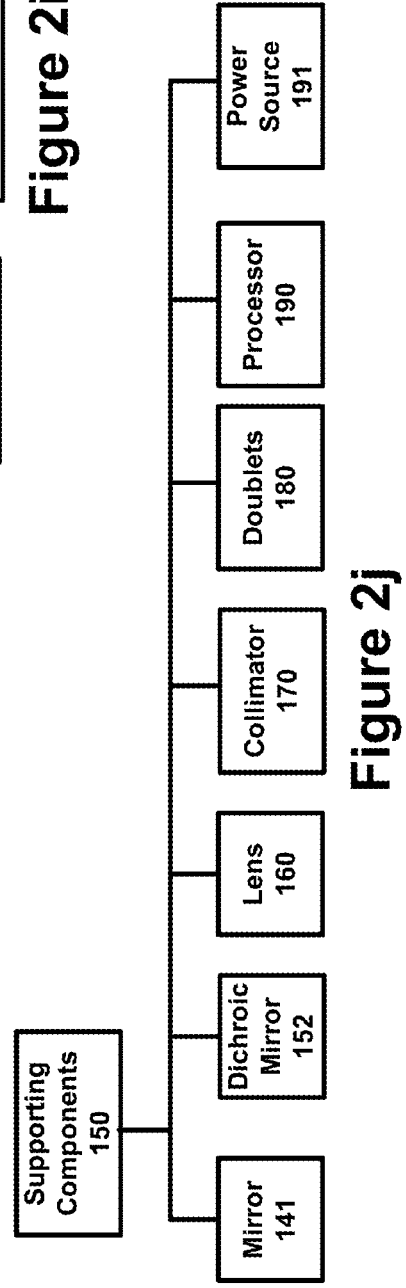

FIG. 2*j* is a hierarchy diagram illustrating examples of different types of supporting components that can be included in the structure and function of the system.

FIG. 2*k* is a block diagram illustrating an example of the light flow used to support the functionality of the tracking assembly.

FIG. 3*a* is a block diagram illustrating an example of a DLP system using a plate-curved mirror configuration and an aspheric lens.

Figure 3B:
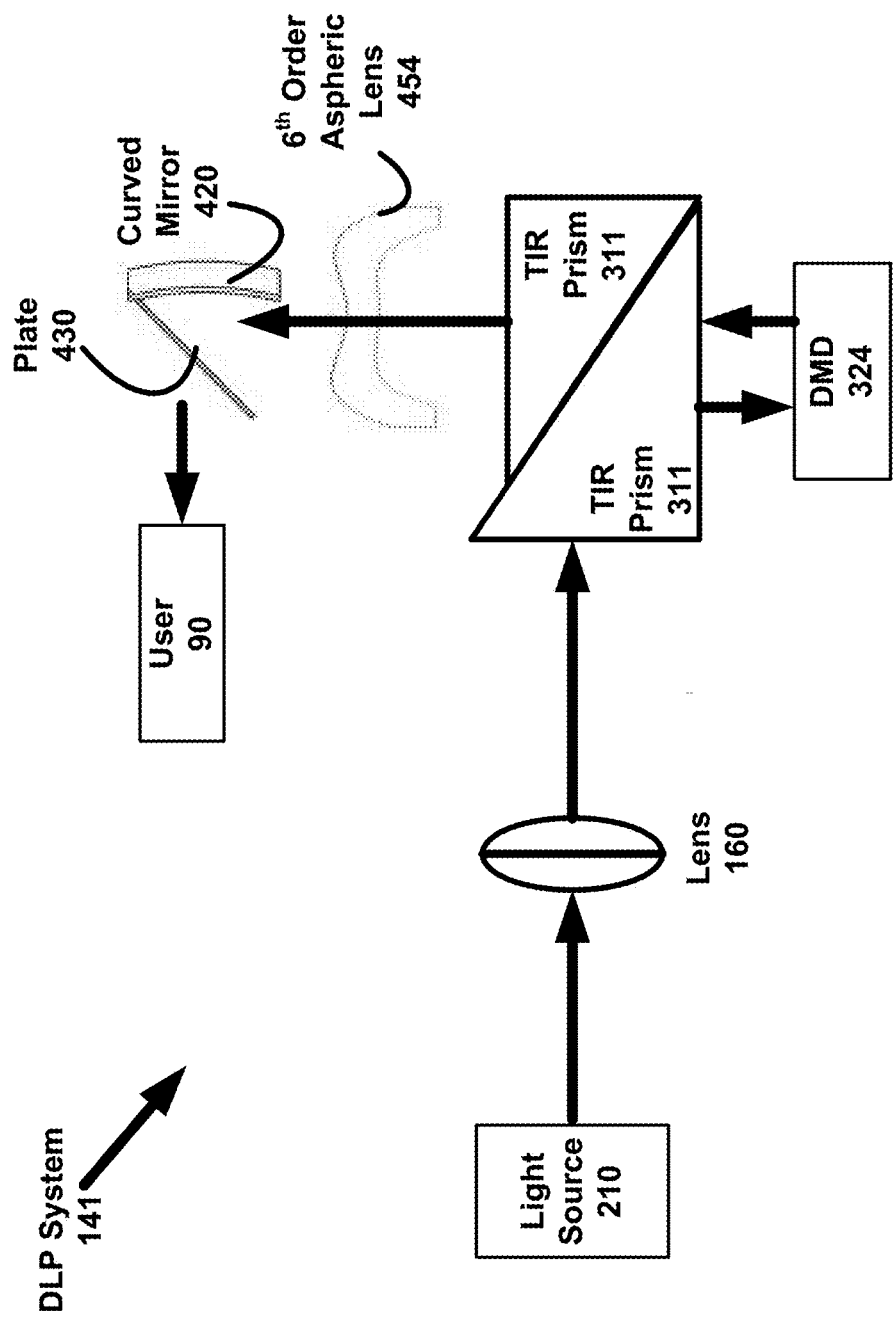

FIG. 3*b* is a block diagram illustrating a more detailed example of a DLP system using a plate-curved mirror and an aspheric lens.

Figure 3C:
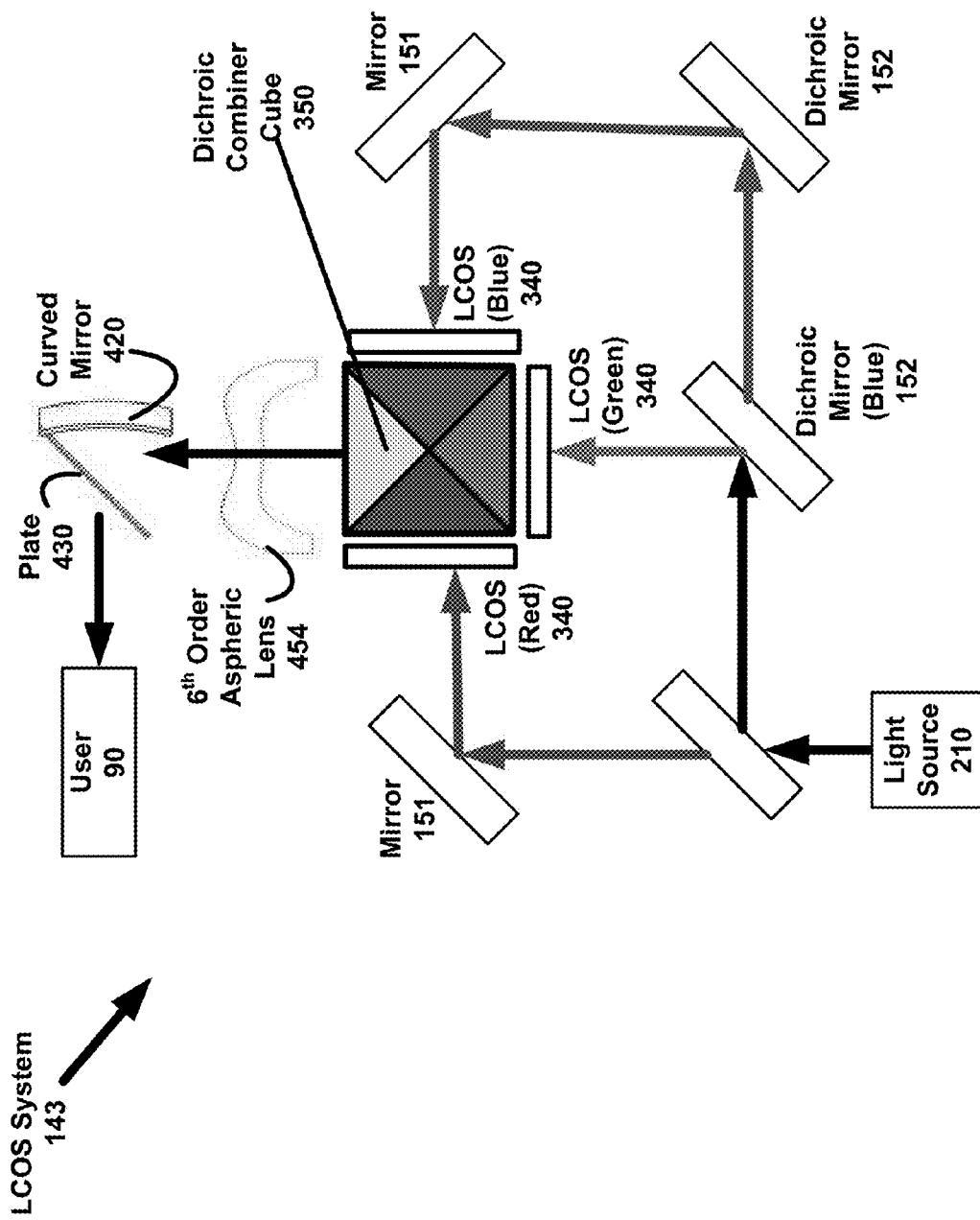

FIG. 3*c* is a block diagram illustrating an example of an LCOS system using a plate-curved mirror and an aspheric lens.

FIG. 4*a* is diagram of a perspective view of a VRD apparatus embodiment of the system.

FIG. 4*b* is environmental diagram illustrating an example of a side view of a user wearing a VRD apparatus embodying the system.

Figure 4C:
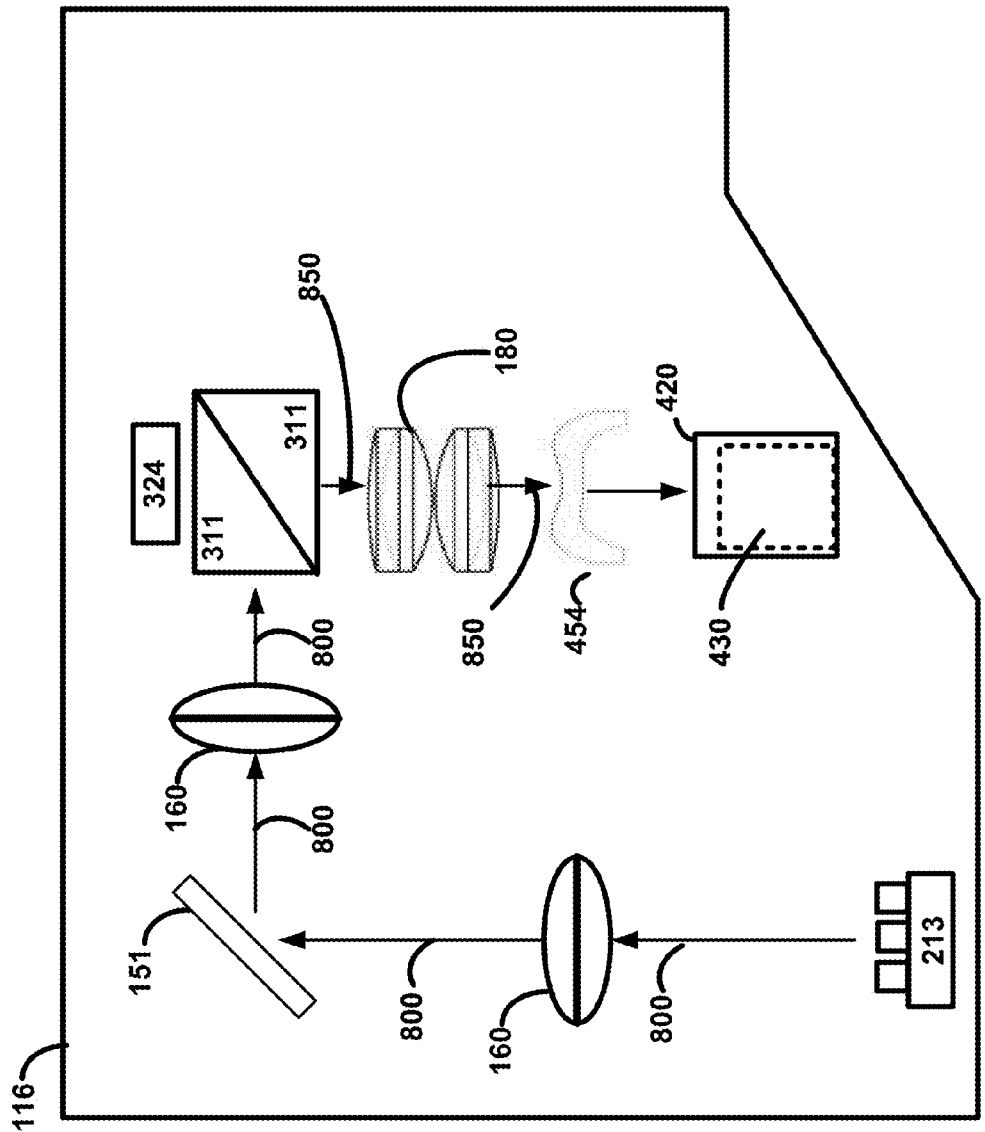

FIG. 4*c* is an architectural diagram illustrating an example of the components that can be used in a VRD apparatus.

Figure 5A:
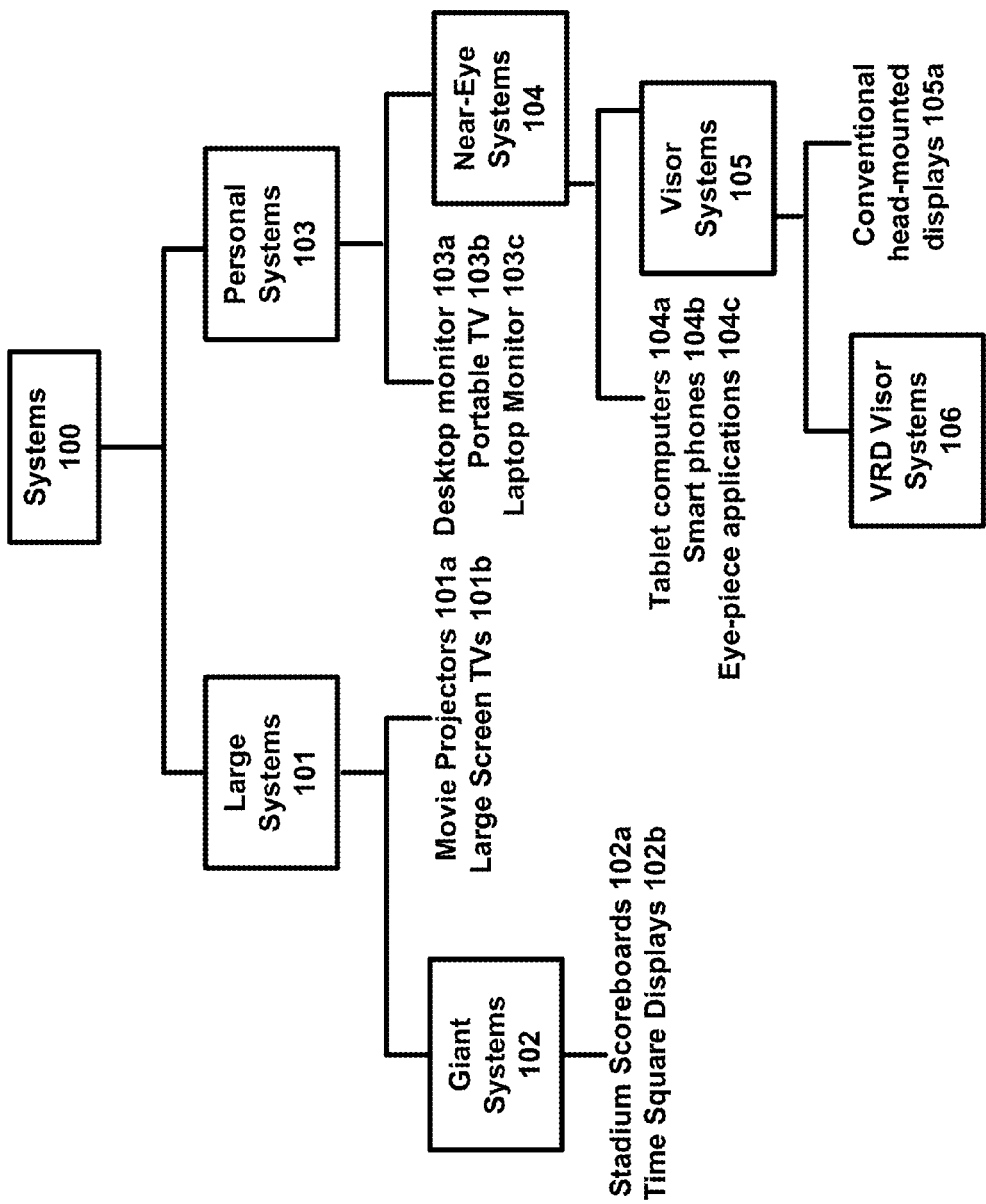

FIG. 5*a* is a hierarchy diagram illustrating an example of the different categories of display systems that the innovative system can be potentially be implemented in, ranging from giant systems such as stadium scoreboards to VRD visor systems that project visual images directly on the retina of an individual user.

Figure 5B:
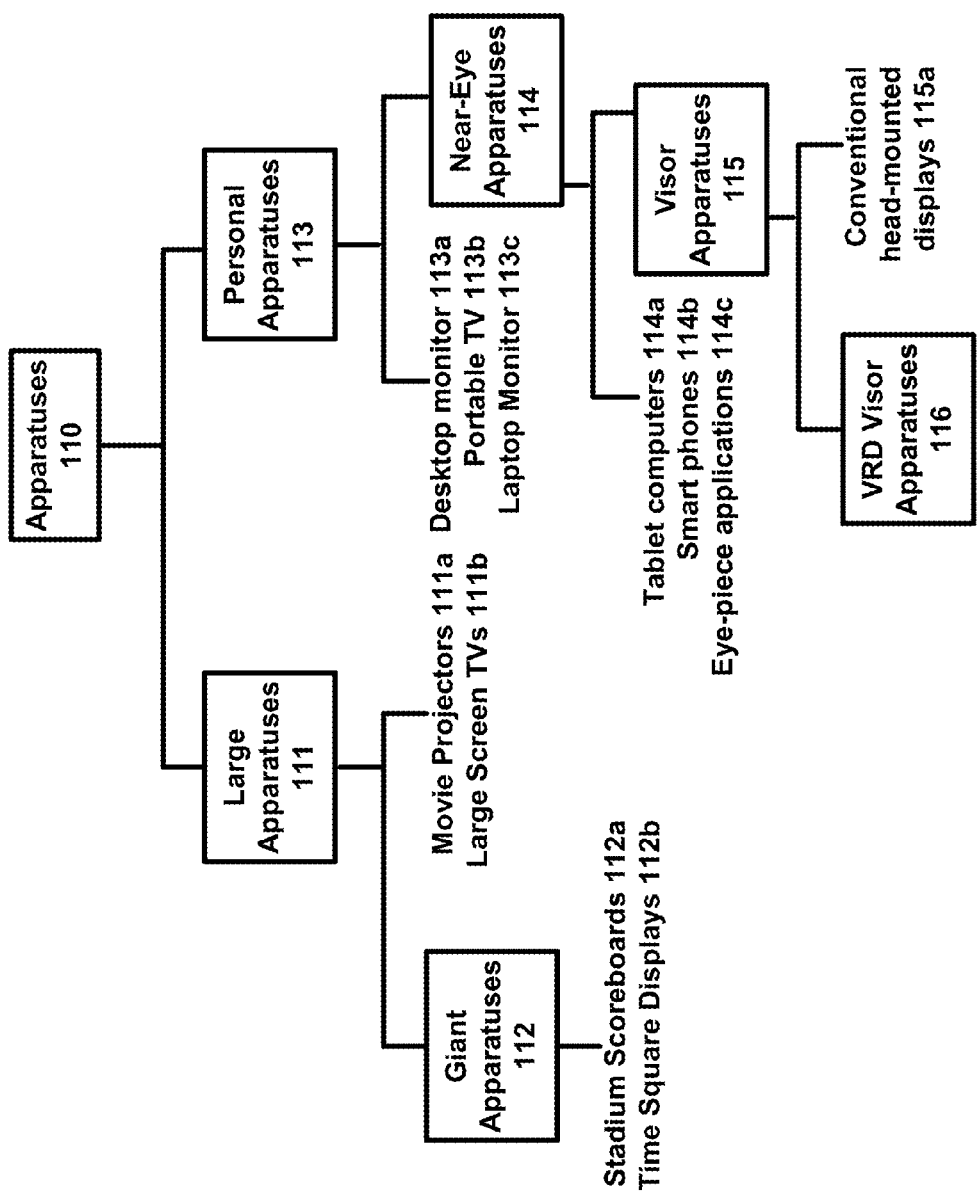

FIG. 5*b* is a hierarchy diagram illustrating an example of different categories of display apparatuses that closely mirrors the systems of FIG. 5*a*.

Figure 5C:
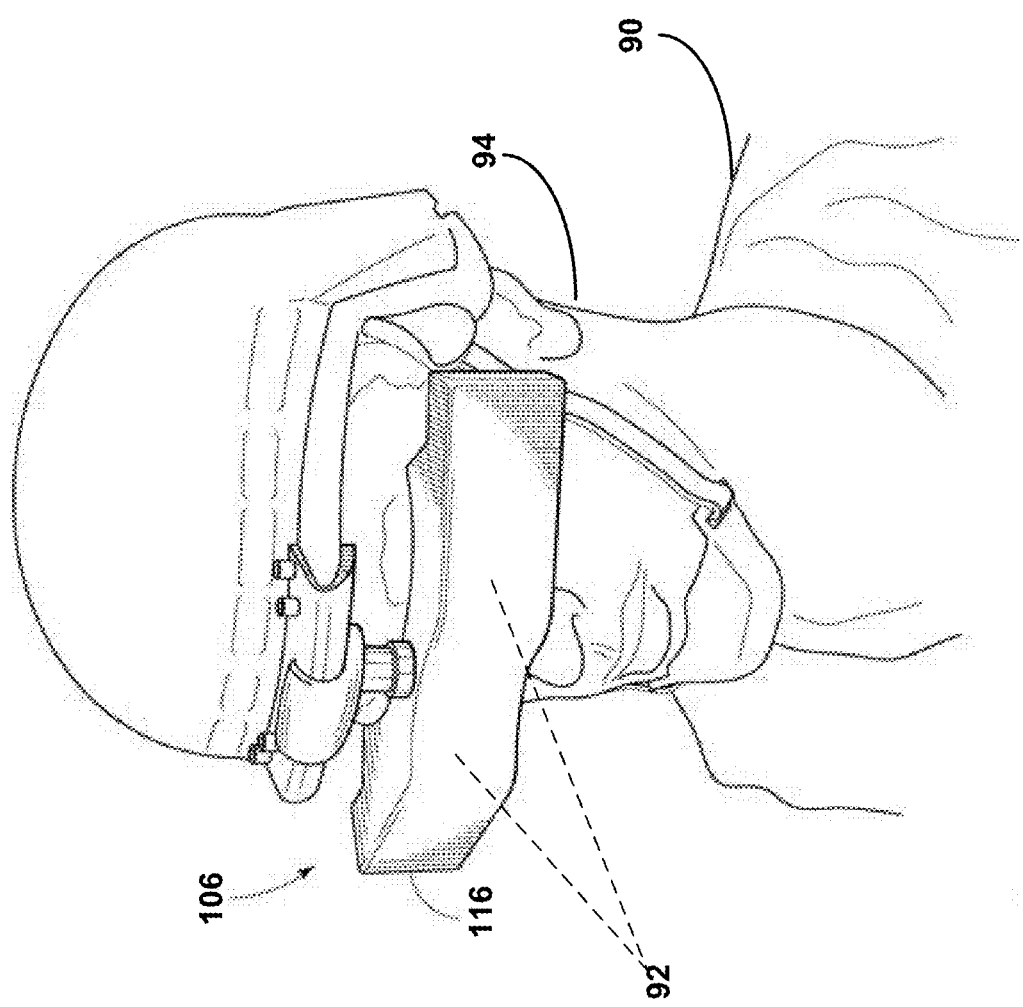

FIG. 5*c* is a perspective view diagram illustrating an example of user wearing a VRD visor apparatus.

FIG. 5*d* is hierarchy diagram illustrating an example of different display/projection technologies that can be incorporated into the system.

FIG. 5*e* is a hierarchy diagram illustrating an example of different operating modes of the system pertaining to immersion and augmentation.

FIG. 5*f* is a hierarchy diagram illustrating an example of different operating modes of the system pertaining to the use of sensors to detect attributes of the user and/or the user's use of the system.

FIG. 5*g* is a hierarchy diagram illustrating an example of different categories of system implementation based on whether or not the device(s) are integrated with media player components.

FIG. 5*h* is hierarchy diagram illustrating an example of two roles or types of users, a viewer of an image and an operator of the system.

Figure 5I:
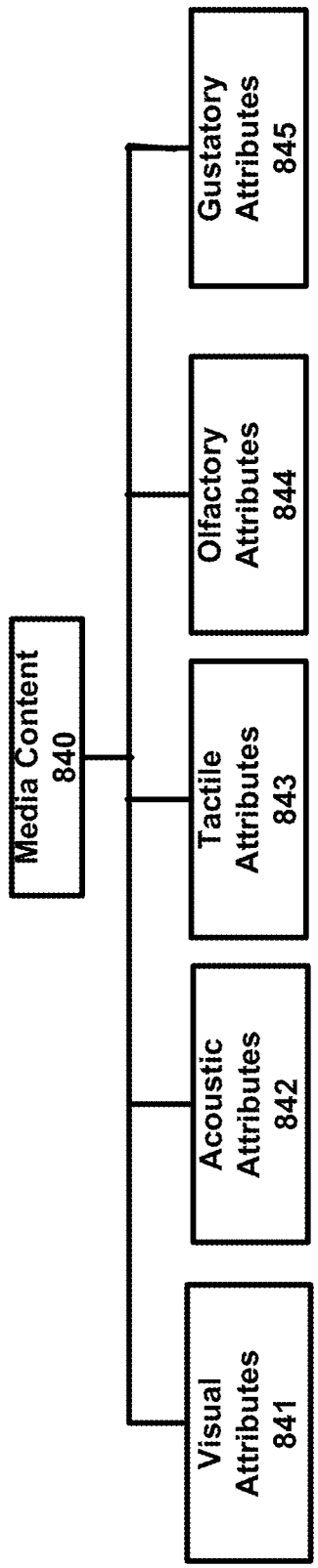

FIG. 5*i* is a hierarchy diagram illustrating an example of different attributes that can be associated with media content.

Figure 5J:
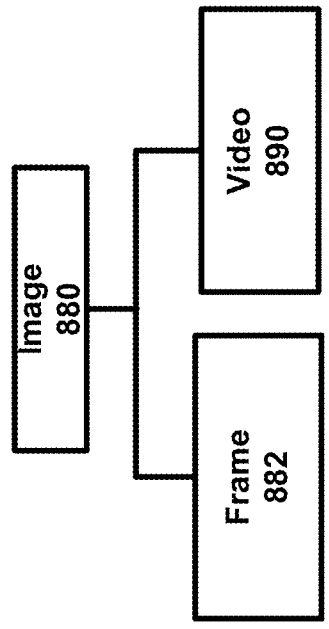

FIG. 5*j* is a hierarchy diagram illustrating examples of different contexts of images.

DETAILED DESCRIPTION

The invention is system, apparatus, and method (collectively the "system") for displaying an image. More specifically, the system can effectively display an image with a wider field of view ("FOV") to a user. The system can provide the viewer with a relatively wider FOV by using an aspheric lens to direct light that is ultimately delivered to the viewer in the form of a displayed image. Use of the aspheric lens can reduce the exit pupil drift that would otherwise result from display of the image with an expanded FOV. It can also correct distortion and act as a field stop.

I. Overview

There are some FOV limitations that are intrinsic to the eye of a human being. Nothing can be done about such limitations. However, the vast majority of image display devices fail provide a substantially smaller FOV than the human eye is capable of perceiving. On the issue of FOV, the limiting factor is the image display device, not the human eye.

Image display devices create light, modulate that light into an interim image, and then direct the modulated light to a location where it can be perceived by one or more viewers. The providers of image display devices typically purport to have the capability for displaying images that are highly realistic, i.e. resemble how images are perceived in the real world.

The process by which an image is perceived in the real word is however vastly different than the process for artificially modulating light in order to display light that resembles an image in the real world. An image display device typically generates light from a common source at a common location, modulates that light through a common process, and then directs the light comprising the image to a destination from which the viewer can perceive it. Providing a realistic image with a significant FOV is often a challenge due to the optical components used to direct the light through the process and towards the destination were it can be perceived by one or more viewers.

One challenge to an expanded FOV image that is nonetheless realistic looking otherwise of sufficient quality of viewers is phenomenon known as "pupil drift". Pupil drift is most easily described in terms of the "exit pupil" in an image. The terms "pupil drift" and "exit pupil" are terms of art of the field of optics, but those terms are nonetheless defined in Table 1 and described below.

A. Exit Pupil

The "exit pupil" is a term of art in the field of optics. Despite inclusion of the word "pupil", the term does not pertain to human eye. The exit pupil is sometimes referred to as the "eyepoint" or the "ramsden circle". The exit pupil is the portion of a beam of light where the cross-section is the smallest. The exit pupil can be described as a "virtual aperture" in an optical system. Only rays of light within the exit pupil can be perceived by the human viewer, and such perception is dependent on a sufficient alignment between the exit pupil of the device and the entrance pupil of the human eye.

FIGS. 1*a* and 1*b* illustrated an example of an idealized exit pupil 470. As illustrated in FIG. 1*b*, the exit pupil 470 is a single point where the chief rays for all the light 800 in the displayed image converge into a single point. The chief rays are traveling at different angles, but they all converge at the exit pupil 470. The diagram illustrates three chief rays, but the wider the FOV the more chief rays there are that will need to converge at the exit pupil 470.

FIG. 1a is a less simplified version of FIG. 1b. FIG. 1a shows more than just the chief rays. Multiple parallel rays of light 800 traveling at different angles can comprise the image that is displayed to the viewer in the form of the image. The chief ray is a term of art used to refer to the middle or center ray in a cluster of parallel rays that are travelling at the same angle.

In FIGS. 1a and 1b, the angle A rays are direct traveling straight or 0°, the angle C is approximately 45°, and angle B is at angle between angle A and angle C, approximately 22.5°. These angles are used for illustration purposes only, as it is for impossible as a practical matter to display all of the numerous light rays and angles that populate the FOV.

In the context of a near-eye display that uses a spherical lens to relay modulated light away from the modulator and towards a curved mirror for delivery of the final image to the user, a horizontal FOV of about 40° can be achieved before the exit pupil drift has significant negative impact on the displayed image. Replacement of the spherical lens with an aspherical lens such as a $6^{th}$ order aspherical lens or a Zernike lens can increase the horizontal FOV to about 66° before the exit pupil drift has a significant negative impact on the displayed image.

B. Drift

Convergence of the light 800 at a single point as illustrated in FIGS. 1a and 1b is an idealized concept that is not a fully achievable practice of engineering. In practical applications of displaying an image, there will be some measure drift in the exit pupil 470. This concept can be described as "exit pupil drift", "optic drift", or simply "drift" or "displacement". FIGS. 1c-1e illustrate examples of substantial pupil drift 480 that can result from an attempt to display an image with a FOV that is too expansive, i.e. beyond the effective FOV capability of the device. Drift 480 is caused by light 800 traveling at relatively high angles. The wider the FOV, the wider the angular range of light that needs to converge into the exit pupil 470, and the greater the resulting exit pupil drift 480. A the FOV increases, the chief ray starts to drift about the exit pupil As illustrated in FIG. 1d, there is significant displacement between the illustrated chief rays of light. That displacement represents the exit pupil drift 480. The chief ray moves to the left, and then to the right of the exit pupil 470 as the viewing angle is increased. As illustrated in FIG. 1e, pupil drift 480 can have a vertical component (vertical drift 484) and a horizontal component (horizontal drift 482). In some instances, pupil drift 480 may also include a depth component. FIG. 1c is a less simplified drawing that corresponds to FIGS. 1d and 1e. FIG. 1c shows chief rays as well as light rays accompanying the chief rays and sharing their angles of motion.

When the drift 480 is relatively small, the impact to the viewer is not significant. Taking a conventional image display device and attempting to modify its design to provide an expanded FOV will however result in an increased exit pupil drift 480. This is undesirable for a variety of reasons. A significant drift 480 can negatively impact the perceived realism of the displayed image. Portions of the displayed image may lose color and brightness. The resulting image is less desirable and less realistic to the viewer. As the FOV increases, the chief ray in the light comprising the image starts to drift 480 about the exit pupil 470, resulted in a distorted image with an incorrect wavefront.

Drift 480 cannot be avoided in absolute terms, but it can be reduced to a magnitude where it is not relevant. A contrast of FIG. 1f (minimal drift) with FIG. 1c (substantial drift), FIG. 1g (minimal drift) with FIG. 1d (substantial drift), and FIG. 1h (minimal drift) with FIG. 1e (substantial drift) illustrates the difference between minimal drift 480 and material drift 480.

Different variables in the image display device will impact how vulnerable the displayed image is to drift 480. Expanding the FOV typically expands that sensitivity. A small display and a close display can further expand that sensitivity. A small eyepiece display can have lower tolerance for drift 480 than a large screen television set.

The use of conical surfaces on an axis, such as spherical lenses, can increase the magnitude of pupil drift 480. In the context of a VRD visor apparatus, a FOV of about 40° can be achieved with spherical lenses used in conjunction with the splitter plate and curved mirror. Beyond a FOV of 40°, pupil drift becomes significant. In the context of a spherical lens, the chief ray of light in the displayed image moves to the left, and then to the right as the viewing angle is increased.

Use of an aspheric lens in place of a spherical lens can extend the effective FOV to up to about 66°. The aspheric lens can also correct wavefront by acting as a field stop. Such an aspheric lens configuration can correct for distortion in the image. A wide variety of different aspheric lenses can be used, including but not limited to a $6^{th}$ order asphere (where sag is defined as a polynominal), a Zernike asphere, and other aspheric configurations. Such lenses can direct the chief rays in different angles depending on the position that such light reaches the lens. Drift of the chief ray can be reduced to about 0.3 mm with an aspheric lens where use of the spherical lens would result in drift greater than 1.4 mm.

Preventing significant drift over a wider FOV helps the system to maintain the proper alignment between the exit pupil of the device and the entrance pupil of the eye can be particularly challenging in the context of head-mounted display device because of the movement of the eye of the viewer. Head-mounted display devices such as a VRD visor apparatus are intended to allow the eye to move and focus on different areas within the displayed image.

C. Spherical Lens

FIG. 1i is a diagram illustrating an example of a spherical lens 449. Use of a spherical lens 449 to direct modulated light 800 can result in increased pupil drift 480 when the field of view is expanded. In some contexts, if a horizontal FOV above 40° is desired, a spherical lens 449 should not and cannot be used to effectively relay an interim image created by the modulator.

The system uses an aspheric lens in place of a spherical lens 449 so that the FOV can be expanded without negative impacts from increased pupil drift 480. In the context of a near-eye micro display, the substitution of an aspheric lens 450 in place of a spherical lens 449 can support an increase in the effective FOV from about 40° to about 66°.

D. Aspheric Lens

FIG. 1i is a diagram illustrating an example of an aspheric lens 450.

FIG. 1k is a diagram illustrating an example of a top view of a $6^{th}$ order aspheric lens 454.

FIG. 1l is a diagram illustrating an example of a cross section view of a $6^{th}$ order aspheric lens 454. The contours of the 6th order aspheric lens 454 may be a particularly desirable way to direct light toward the exit pupil at various outgoing angles corresponding to the a variety of incoming angles.

FIG. 1m is a diagram illustrating an example of variously angled rays of light 800 passing through a $6^{th}$ order aspheric lens 454. As Illustrated in the figure, the geometry of the aspheric lens 454 makes it an effective tool to converge light 800 towards the exit pupil 470.

E. Projection Configuration—Splitting Plate and Curved Mirror

FIG. 1n is a block diagram illustrating an example of a pathway of light from its generation by a light assembly 200 and ending in the display of an image 880 to the eye 92 of a viewer 96. The imaging assembly 300 modulates light 800 from the illumination assembly 200 forming an interim image 850 that is directed by an aspheric lens 450 towards a splitter plate 430 that is partially transparent and partially reflective. The portion of light 800 reflecting off of the plate 430 is directed to the curved mirror 420 which reflects the light 800 back to the plate 430. A portion of that light 800 passes through the plate 430 where it reaches the eye 92 of the viewer 96.

F. Eye Tracking and Augmentation

FIG. 10 is a block diagram illustrating an example of the system 100 illustrated in FIG. 1n, further including light 832 from the exterior environment 650 to support an augmentation mode of the system 100 and an eye tracking attribute 830 in the form of light from a tracking assembly to track the eye movements of the viewer 96. The system 100 does not need to include a tracking mode or an augmentation mode. However, both modes can be useful. The configuration of an aspheric lens 450, a splitter plate 430, and a curved mirror 420 can support such operating modes.

G. Eyepiece View and Field of View

FIG. 1p is a front view diagram illustrating an example of a splitter plate 430 and curved mirror 420 configuration as what would face the eye 92 of the viewer 96 in the context of a visor apparatus 115 embodiment of the system 100. FIG. 1q is a block diagram illustrating an example of an apparatus 115 providing the viewer 96 with a field of view 860.

The substitution of an aspheric lens 450 in place of a spherical lens 165 can increase a truly effective field of view (FOV) 860 over 40°, 50°, 60°, or even up to about 66°. Such functionality can be particularly beneficial in the context of a visor apparatus 115 such as a VRD visor apparatus 116. Some implementations of the 6$^{th}$ order aspheric lens 454 can reduce the drift 480 of the exit pupil 470 from more than 1.4 mm to about 0.3 mm, a reduction of more than 75%.

H. Process Flow View

FIG. 1s is a flow chart diagram illustrating an example of a process 900 for displaying an image 880 that utilizes an aspheric lens 450 to direct the light 800 used in the image 880 displayed to the user 90.

At 910, the light 800 is generated by a light source 210. The method 900 can utilize a wide variety of different types and numbers of light sources 210.

At 920, the light 800 generated by the light source 210 is modulated by a modulator 320, resulting in an interim image 850. The method 900 can include a wide variety of different modulators 320.

At 930, the interim image 850 is directed using an aspheric lens 450 and is otherwise focused, finalized, and delivered as the final image 880 that is made accessible to the user 90. Use of the aspheric lens 450 instead of a spherical lens 449 increases the effective FOV of the image 880 that the method 900 can display.

The process then ends, although in the context of video images, this process repeats with each frame within the video.

II. Assemblies and Components

The system 100 can be described in terms of assemblies of components that perform various functions in support of the operation of the system 100. A wide variety of different system 100 configurations can benefit by utilizing an aspherical lens 450 in place of a spherical lens 449 to direct light. The aspherical lens 450 can be described as a relay lens in that it relays light in the interim image generated by the modulator.

FIG. 2a is a block diagram illustrating an example of different assemblies that can be present in the operation of the system 100, such as an illumination assembly 200, an imaging assembly 300, and a projection assembly 400. The illumination assembly 200 includes a light source 210 that supplies the light 800 for the image 880. A modulator 320 in the imaging assembly 300 modulates the incoming light 800 to form an image 880. At this stage, the image 880 can sometimes be referred to as an interim image 850 since it is still be modified, focused, or otherwise impacted by the processing of the system 100 in certain ways. Nonetheless, the modulator 320 is responsible for transforming the raw material of light 800 into something for viewers 96 to see. A projection assembly 300, including the at least partially transparent plate 430 and the curved mirror 420 receive the image 880 from the imaging assembly 300 and project it to the viewer 96. In the case of a VRD visor apparatus 116, the image 880 is projected onto the eye 92 of the viewer 96.

As illustrated in FIGS. 1o, 2b, and 2d, the system 100 may also include a tracking assembly 500 to track the movement of the viewer's eye. This can be done while images 880 are being displayed, or when no images 880 are being displayed. As illustrated in FIGS. 2c and 2d, the system 100 may also include an augmentation assembly 600 to allow the viewer 96 to see both the image 880 from the media content as well as the exterior environment image 650. This can be referred to as augmented reality.

A. Illumination Assembly

An illumination assembly 200 performs the function of supplying light 800 to the system 100 so that an image 880 can be displayed. FIG. 2e is a hierarchy diagram illustrating an example of different components that can be included in the illumination assembly 200. Those components can include but are not limited a wide range of light sources 210, a color wheel or other type of colorizing filter, a diffuser, and a variety of supporting components 150. Examples of light sources 210 can include but are such as a multi-bulb light source 211, an LED lamp 212, a 3 LED lamp 213, a laser 214, an OLED 215, a CFL 216, an incandescent lamp 218, and a non-angular dependent lamp 219. The light source 210 is where light 800 is generated and moves throughout the rest of the system 100.

B. Imaging Assembly

An imaging assembly 300 performs the function of creating the image 880 from the light 800 supplied by the illumination assembly 200. A modulator 320 can transform the light 800 supplied by the illumination assembly 200 into the image 880 that is displayed by the system 100. The image 880 generated by the imaging assembly 300 can sometimes be referred to as an interim image 850 because the image 850 may be focused or otherwise modified to some degree before it is directed to the location where it can be experienced by one or more users 90.

Imaging assemblies 300 can vary significantly based on the type of technology used to create the image. Display technologies such as DLP (digital light processing), LCD (liquid-crystal display), LCOS (liquid crystal on silicon), and other methodologies can involve substantially different components in the imaging assembly 300.

FIG. 2f is a hierarchy diagram illustrating an example of different components that can be utilized in the imaging assembly 300 for the system 100. A prism 310 can be a very useful component in directing light to and/or from the modulator 320. DLP applications will typically use an array of TIR prisms 311 or RTIR prisms 312 to direct light to and from a DMD 324.

A light modulator 320 is the device that modifies or alters the light 800, creating the image 880 that is to be displayed. Modulators 320 can operate using a variety of different attributes of the modulator 320. A reflection-based modulator 322 uses the reflective-attributes of the modulator 320 to fashion an image 880 from the supplied light 800. Examples of reflection-based modulators 322 include but are not limited to the DMD 324 of a DLP display and some LCOS (liquid crystal on silicon) panels 340. A transmissive-based modulator 321 uses the transmissive-attributes of the modulator 320 to fashion an image 880 from the supplied light 800. Examples of transmissive-based modulators 321 include but are not limited to the LCD (liquid crystal display) 330 of an LCD display and some LCOS panels 340. The imaging assembly 300 for an LCOS or LCD system 100 will typically have a combiner cube 350 or some similar device for integrating the different one-color images into a single image 880.

The imaging assembly 300 can also include a wide variety of supporting components 150.

C. Projection Assembly

The projection assembly 400 can perform the task of directing the image 880 to its final destination in the system 100 where it can be accessed by users 90. In many instances, the image 880 created by the imaging assembly 300 will be modified in at least some minor ways between the creation of the image 880 by the modulator 320 and the display of the image 880 to the user 90. Thus, the image 880 generated by the modulator 320 of the imaging assembly 400 may only be an interim image 850, not the final version of the image 880 that is actually displayed to the user 90.

FIG. 2g is a hierarchy diagram illustrating an example of different components that can be part of the projection assembly 400. The curved mirror 420 (which will typically be a half-silvered mirror 422 is augmentation is a desired capability) and a partially transparent plate 430 can be accompanied by a variety of supporting components 150 that can fairly be characterized as conventional optics. The partially transparent plate 430 can also be referred to as a splitter plate 430 because the splitter plate 430 because the plate 430 reflects some light, while allowing other light 800 to transmit through the plate 430. In conjunction with the curved mirror 420 can act as traffic cops in directing some light towards the eye 92 of the user 90 in the form of the displayed image 880 while the sensing assembly 500 directs light from the eye 92 of the user 90 so that the system 100 can capture eye tracking attributes 530 from the eye 92 of the user 90.

D. Tracking/Sensing Assembly

As illustrated in FIG. 2h, the tracking assembly 500 will typically include a lamp such as an infrared lamp 520, a camera such as an infrared camera 520 and a variety of supporting components. A quad photodiode array or a CCD may be included in the assembly 500 for the purpose of eye tracking. FIG. 2k is an input output diagram illustrating an example of the light flow that can be implemented by the tracking assembly 830. A lamp 520 generates light 830 so that the camera 510 can "see" the eye 92 of the viewer 96. Since the generated light 830 is serving as a type of flash and is not being used to project an image, the infrared lamp 520 can be positioned in a variety of different places. One reason to use infrared light 830 is that it will not interfere with the image 880 of the exterior environment image 650 since infrared light 830 is invisible to the viewer 96.

F. Augmentation Assembly

An augmentation assembly 600 provides the capability of viewing external environment images 650 simultaneously with the displayed images 880 generated from the media or streaming source. As illustrated in FIG. 2i, the augmentation assembly 2i can include a window component 620 that provides for the exterior light 650 to reach the viewer's eye, a shutter component 610 that provides for closing or blocking the window component 620, and a variety of supporting components 150 if necessary or helpful to the particular context.

G. Supporting Components

Light 800 can be a challenging resource to manage. Light 800 moves quickly and cannot be constrained in the same way that most inputs or raw materials can be. FIG. 2j is a hierarchy diagram illustrating an example of some supporting components 150, many of which are conventional optical components. Any display technology application will involve conventional optical components such as mirrors 141 (including dichroic mirrors 152) lenses 160, collimators 170, and doublets 180. Similarly, any powered device requires a power source 191 and a device capable of displaying an image 880 is likely to have a processor 190.

III. Different Display Technologies

The system 100 can be implemented with respect to a wide variety of different display technologies, including but not limited to DLP and LCOS.

A. DLP Embodiments

FIG. 3a illustrates an example of a DLP system 141, i.e. an embodiment of the system 100 that utilizes DLP optical elements. DLP systems 141 utilize a DMD 324 (digital micromirror device) comprised of millions of tiny mirrors as the modulator 320. Each micro mirror in the DMD 324 can pertain to a particular pixel in the image 880.

As discussed above, the illumination assembly 200 includes a light source 210 for supplying light 800. The light 800 then passes to the imaging assembly 300. Two TIR prisms 311 direct the light 800 to the DMD 324, the DMD 324 creates an image 880 with that light 800, and the TIR prisms 311 then direct the light 800 embodying the image 880 to the configuration of the plate 430 and curved mirror 420 which together function to deliver the image 880 onto the eye 92 of the viewer 96.

FIG. 3b is a more detailed example of a DLP system 141. In that it includes additional lenses 160 that can be helpful to direct the flow of light. Similarly, components such as a color wheel or other similar components could be added to enable the image 880 to be in color. A lens 160 is positioned before the display 410 to modify/focus image 880 before providing the image 880 to the viewer 96.

B. LCD Embodiments

FIG. 3c is a diagram illustrating an example of an LCOS system 143. LCOS is a hybrid between DLP and LCD. LCOS stands for liquid crystal on silicon displays. LCD stands for liquid crystal display. The modulator 320 in an LCD system 142 is one or more LCD panels 330 comprised of liquid crystals which are electronically manipulated to form the image 880. The LCOS panel 340 is an LCD panel that includes a computer chip analogous to the chip found in a DMD 324 of a DLP application.

The illumination assembly 200 in an LCOS system 143 typically include a variety of dichroic mirrors 152 that separate light 800 into three component colors, typically red, green, and blue—the same colors on many color wheels 240 found in a DLP application.

The LCDs 330 form single color images which are combined into a multi-color image 880 by a dichroic combiner cube 320 or some similar device.

IV. VRD Visor Embodiments

The system 100 can be implemented in a wide variety of different configurations and scales of operation. However, the original inspiration for the conception of the multiple diffuser concept occurred in the context of a VRD visor system 106 embodied as a VRD visor apparatus 116. A VRD visor apparatus 116 projects the image 880 directly onto the eyes of the user 90. The VRD visor apparatus 116 is a device that can be worn on the head of the user 90. In many embodiments, the VRD visor apparatus 116 can include sound as well as visual capabilities. Such embodiments can include multiple modes of operation, such as visual only, audio only, and audio-visual modes. When used in a non-visual mode, the VRD apparatus 116 can be configured to look like ordinary headphones.

FIG. 4a is a perspective diagram illustrating an example of a VRD visor apparatus 116. Two VRD eyepieces 418 provide for directly projecting the image 880 onto the eyes of the user 90. The "eyepiece" 418 is essentially a passageway for light to travel between the plate 430 and the eye 92 of the viewer. The plate 430 is the last object that the image 880 hits before reaching the eye 92 of the viewer 96. The image 880 hits the plate 430 twice (FIG. 1n). The image 880 hits the curved mirror 420 only once (FIG. 1n). As illustrated by the front i.e. eye facing view of FIG. 1p, the configuration of plate 430 and curved mirror 420 can form a virtual eyepiece in a VRD display.

FIG. 4b is a side view diagram illustrating an example of a VRD visor apparatus 116 being worn on the head 94 of a user 90. The eyes 92 of the user 90 are blocked by the apparatus 116 itself, with the apparatus 116 in a position to project the image 880 on the eyes 92 of the user 90.

FIG. 4c is a component diagram illustrating an example of a VRD visor apparatus 116 for the left eye 92. A mirror image of FIG. 4c would pertain to the right eye 92.

A 3 LED light source 213 generates light 800 that passes through a condensing lens 160 which directs the light 800 to a mirror 151 which reflects the light 800 to a shaping lens 160 prior to the entry of the light 800 into an imaging assembly 300 comprised of two TIR prisms 311 and a DMD 324. The interim image 850 from the imaging assembly 300 passes through two doublets 180 and another lens 160 that focuses the interim image 850 into a final image 880 that is viewable to the user 90 through the plate 430/mirror 420 configuration.

V. Alternative Embodiments

No patent application can expressly disclose in words or in drawings, all of the potential embodiments of an invention. Variations of known equivalents are implicitly included. In accordance with the provisions of the patent statutes, the principles, functions, and modes of operation of the systems 100, methods 900, and apparatuses 110 (collectively the "system" 100) are explained and illustrated in certain preferred embodiments. However, it must be understood that the inventive systems 100 may be practiced otherwise than is specifically explained and illustrated without departing from its spirit or scope.

The description of the system 100 provided above and below should be understood to include all novel and non-obvious alternative combinations of the elements described herein, and claims may be presented in this or a later application to any novel non-obvious combination of these elements. Moreover, the foregoing embodiments are illustrative, and no single feature or element is essential to all possible combinations that may be claimed in this or a later application.

The system 100 represents a substantial improvement over prior art display technologies. Just as there are a wide range of prior art display technologies, the system 100 can be similarly implemented in a wide range of different ways. The innovation of utilizing an aspherical lens 450 in tandem with a projection assembly 400, such as a partially transparent plate 430 and curved mirror 420 can be implemented at a variety of different scales, utilizing a variety of different display technologies, in both immersive and augmenting contexts, and in both one-way (no sensor feedback from the user 90) and two-way (sensor feedback from the user 90) embodiments.

A. Variations of Scale

Display devices can be implemented in a wide variety of different scales. The monster scoreboard at EverBanks Field (home of the Jacksonville Jaguars) is a display system that is 60 feet high, 362 feet long, and comprised of 35.5 million LED bulbs. The scoreboard is intended to be viewed simultaneously by tens of thousands of people. At the other end of the spectrum, the GLYPH™ visor by Avegant Corporation is a device that is worn on the head of a user and projects visual images directly in the eyes of a single viewer. Between those edges of the continuum are a wide variety of different display systems. While the specification motivations for the system 100 are very much grounded in visor systems 105 and particularly VRD visor systems 106, that is not to say that the concepts have no utility outside those contexts.

The system 100 can be potentially implemented in a wide variety of different scales or for the structures to be used to serve different purposes.

FIG. 5a is a hierarchy diagram illustrating various categories and subcategories pertaining to the scale of implementation for display systems generally, and the system 100 specifically. As illustrated in FIG. 5a, the system 100 can be implemented as a large system 101 or a personal system 103

1. Large Systems

A large system 101 is intended for use by more than one simultaneous user 90. Examples of large systems 101 include movie theater projectors, large screen TVs in a bar, restaurant, or household, and other similar displays. Large systems 101 include a subcategory of giant systems 102, such as stadium scoreboards 102a, the Time Square displays 102b, or other or the large outdoor displays such as billboards off the expressway.

2. Personal Systems

A personal system 103 is an embodiment of the system 100 that is designed to for viewing by a single user 90. Examples of personal systems 103 include desktop monitors 103a, portable TVs 103b, laptop monitors 103c, and other similar devices. The category of personal systems 103 also includes the subcategory of near-eye systems 104.

a. Near-Eye Systems

A near-eye system 104 is a subcategory of personal systems 103 where the eyes of the user 90 are within about 12 inches of the display. Near-eye systems 104 include tablet computers 104a, smart phones 104b, and eye-piece applications 104c such as cameras, microscopes, and other similar devices. The subcategory of near-eye systems 104 includes a subcategory of visor systems 105.

b. Visor Systems

A visor system 105 is a subcategory of near-eye systems 104 where the portion of the system 100 that displays the visual image 200 is actually worn on the head 94 of the user 90. Examples of such systems 105 include virtual reality visors, Google Glass, and other conventional head-mounted displays 105a. The category of visor systems 105 includes the subcategory of VRD visor systems 106.

c. VRD Visor Systems

A VRD visor system 106 is an implementation of a visor system 105 where visual images 200 are projected directly on the eyes of the user. The technology of projecting images directly on the eyes of the viewer is disclosed in a published patent application titled "IMAGE GENERATION SYSTEMS AND IMAGE GENERATING METHODS" (U.S. Ser. No. 13/367,261) that was filed on Feb. 6, 2012, the contents of which are hereby incorporated by reference. It is anticipated that a VRD visor system 106 is particularly well suited for the implementation of the multiple diffuser 140 approach for reducing the coherence of light 210.

3. Integrated Apparatus

Media components tend to become compartmentalized and commoditized over time. It is possible to envision display devices where an illumination assembly 120 is only temporarily connected to a particular imaging assembly 160. However, in most embodiments, the illumination assembly 120 and the imaging assembly 160 of the system 100 will be permanently (at least from the practical standpoint of users 90) into a single integrated apparatus 110. FIG. 5b is a hierarchy diagram illustrating an example of different categories and subcategories of apparatuses 110. FIG. 5b closely mirrors FIG. 5a. The universe of potential apparatuses 110 includes the categories of large apparatuses 111 and personal apparatuses 113. Large apparatuses 111 include the subcategory of giant apparatuses 112. The category of personal apparatuses 113 includes the subcategory of near-eye apparatuses 114 which includes the subcategory of visor apparatuses 115. VRD visor apparatuses 116 comprise a category of visor apparatuses 115 that implement virtual retinal displays, i.e. they project visual images 200 directly into the eyes of the user 90.

FIG. 5c is a diagram illustrating an example of a perspective view of a VRD visor system 106 embodied in the form of an integrated VRD visor apparatus 116 that is worn on the head 94 of the user 90. Dotted lines are used with respect to element 92 because the eyes 92 of the user 90 are blocked by the apparatus 116 itself in the illustration.

B. Different Categories of Display Technology

The prior art includes a variety of different display technologies, including but not limited to DLP (digital light processing), LCD (liquid crystal displays), and LCOS (liquid crystal on silicon). FIG. 5d, which is a hierarchy diagram illustrating different categories of the system 100 based on the underlying display technology in which the two (or more) diffusers 282 separated by a gap 290 can be implemented. As illustrated in FIG. 5d, the system 100 can be implemented as a DLP system 141, an LCOS system 143, and an LCD system 142. The system 100 can also be implemented in other categories and subcategories of display technologies.

C. Immersion vs. Augmentation

FIG. 5e is a hierarchy diagram illustrating a hierarchy of systems 100 organized into categories based on the distinction between immersion and augmentation. Some embodiments of the system 100 can have a variety of different operating modes 120. An immersion mode 121 has the function of blocking out the outside world so that the user 90 is focused exclusively on what the system 100 displays to the user 90. In contrast, an augmentation mode 122 is intended to display visual images 200 that are superimposed over the physical environment of the user 90. The distinction between immersion and augmentation modes of the system 100 is particularly relevant in the context of near-eye systems 104 and visor systems 105.

Some embodiments of the system 100 can be configured to operate either in immersion mode or augmentation mode, at the discretion of the user 90. While other embodiments of the system 100 may possess only a single operating mode 120.

D. Display Only vs. Display/Detect/Track/Monitor

Some embodiments of the system 100 will be configured only for a one-way transmission of optical information. Other embodiments can provide for capturing information from the user 90 as visual images 880 and potentially other aspects of a media experience are made accessible to the user 90. FIG. 5f is a hierarchy diagram that reflects the categories of a one-way system 124 (a non-sensing operating mode 124) and a two-way system 123 (a sensing operating mode 123). A two-way system 123 can include functionality such as retina scanning and monitoring. Users 90 can be identified, the focal point of the eyes 92 of the user 90 can potentially be tracked, and other similar functionality can be provided. In a one-way system 124, there is no sensor or array of sensors capturing information about or from the user 90.

E. Media Players—Integrated vs. Separate

Display devices are sometimes integrated with a media player. In other instances, a media player is totally separate from the display device. By way of example, a laptop computer can include in a single integrated device, a screen for displaying a movie, speakers for projecting the sound that accompanies the video images, a DVD or BLU-RAY player for playing the source media off a disk. Such a device is also capable of streaming FIG. 5g is a hierarchy diagram illustrating a variety of different categories of systems 100 based on the whether the system 100 is integrated with a media player or not. An integrated media player system 107 includes the capability of actually playing media content as well as displaying the image 880. A non-integrated media player system 108 must communicate with a media player in order to play media content.

F. Users—Viewers vs. Operators

FIG. 5h is a hierarchy diagram illustrating an example of different roles that a user 90 can have. A viewer 96 can access the image 880 but is not otherwise able to control the functionality of the system 100. An operator 98 can control the operations of the system 100, but cannot access the image 880. In a movie theater, the viewers 96 are the patrons and the operator 98 is the employee of the theater.

G. Attributes of Media Content

As illustrated in FIG. 5i, media content 840 can include a wide variety of different types of attributes. A system 100 for displaying an image 880 is a system 100 that plays media content 840 with a visual attribute 841. However, many instances of media content 840 will also include an acoustic attribute 842 or even a tactile attribute. Some new technologies exist for the communication of olfactory attributes 844 and it is only a matter of time before the ability to transmit gustatory attributes 845 also become part of a media experience in certain contexts.

As illustrated in FIG. 5j, some images 880 are parts of a larger video 890 context. In other contexts, an image 880 can be stand-alone still frame 882.

VI. Glossary/Definitions

Table 1 below sets forth a list of element numbers, names, and descriptions/definitions.

| # | Name | Definition/Description |
|---|------|------------------------|
| 90 | User | A user 90 is a viewer 96 and/or operator 98 of the system 100. The user 90 is typically a human being. In alternative embodiments, users 90 can be different organisms such as dogs or cats, or even automated technologies such as expert systems, artificial intelligence applications, and other similar "entities". |
| 92 | Eye | An organ of the user 90 that provides for the sense of sight. The eye consists of different portions including but not limited to the sclera, iris, cornea, pupil, and retina. Some embodiments of the system 100 involve a VRD visor apparatus 116 that can project the desired image 880 directly onto the eye 92 of the user 90. |
| 94 | Head | The portion of the body of the user 90 that includes the eye 92. Some embodiments of the system 100 can involve a visor apparatus 115 that is worn on the head 94 of the user 90. |
| 96 | Viewer | A user 90 of the system 100 who views the image 880 provided by the system 100. All viewers 96 are users 90 but not all users 90 are viewers 96. The viewer 96 does not necessarily control or operate the system 100. The viewer 96 can be a passive beneficiary of the system 100, such as a patron at a movie theater who is not responsible for the operation of the projector or someone wearing a visor apparatus 115 that is controlled by someone else. |
| 98 | Operator | A user 90 of the system 100 who exerts control over the processing of the system 100. All operators 98 are users 90 but not all users 90 are operators 98. The operator 98 does not necessarily view the images 880 displayed by the system 100 because the operator 98 may be someone operating the system 100 for the benefit of others who are viewers 96. For example, the operator 98 of the system 100 may be someone such as a projectionist at a movie theater or the individual controlling the system 100. |
| 100 | System | A collective configuration of assemblies, subassemblies, components, processes, and/or data that provide a user 90 with the functionality of engaging in a media experience such as viewing an image 890. Some embodiments of the system 100 can involve a single integrated apparatus 110 hosting all components of the system 100 while other embodiments of the system 100 can involve different non-integrated device configurations. Some embodiments of the system 100 can be large systems 102 or even giant system 101 while other embodiments of the system 100 can be personal systems 103, such as near-eye systems 104, visor systems 105, and VRD visor systems 106. Systems 100 can also be referred to as media systems 100 or display systems 100. |
| 101 | Giant System | An embodiment of the system 100 intended to be viewed simultaneously by a thousand or more people. Examples of giant systems 101 include scoreboards at large stadiums, electronic billboards such the displays in Time Square in New York City, and other similar displays. A giant system 100 is a subcategory of large systems 102. |
| 102 | Large System | An embodiment of the system 100 that is intended to display an image 880 to multiple users 90 at the same time. A large system 102 is not a personal system 103. The media experience provided by a large system 102 is intended to be shared by a roomful of viewers 96 using the same illumination assembly 200, imaging assembly 300, and projection assembly 400. Examples of large systems 102 include but are not limited to a projector/screen configuration in a movie theater, classroom, or conference room; television sets in sports bar, airport, or residence; and scoreboard displays at a stadium. Large systems 101 can also be referred to as large media systems 101. |
| 103 | Personal System | A category of embodiments of the system 100 where the media experience is personal to an individual viewer 96. Common examples of personal media systems include desktop computers (often referred to as personal computers), laptop computers, portable televisions, and near-eye systems 104. Personal systems 103 can also be referred to as personal media systems 103. Near-eye systems 104 are a subcategory of personal systems 103. |
| 104 | Near-Eye System | A category of personal systems 103 where the media experience is communicated to the viewer 96 at a distance that is less than or equal to about 12 inches (30.48 cm) away. Examples of near-eye systems 103 include but are not limited to tablet computers, smart phones, and visor media systems 105. Near-eye systems 104 can also be referred to as near-eye media systems 104. Near-eye systems 104 include devices with eye pieces such as cameras, telescopes, microscopes, etc. |

| # | Name | Definition/Description |
|---|---|---|
| 105 | Visor System | A category of near-eye media systems 104 where the device or at least one component of the device is worn on the head 94 of the viewer 96 and the image 880 is displayed in close proximity to the eye 92 of the user 90. Visor systems 105 can also be referred to as visor media systems 105. |
| 106 | VRD Visor System | VRD stands for a virtual retinal display. VRDs can also be referred to as retinal scan displays ("RSD") and as retinal projectors ("RP"). VRD projects the image 880 directly onto the retina of the eye 92 of the viewer 96. A VRD Visor System 106 is a visor system 105 that utilizes a VRD to display the image 880 on the eyes 92 of the user 90. A VRD visor system 106 can also be referred to as a VRD visor media system 106. |
| 110 | Apparatus | An at least substantially integrated device that provides the functionality of the system 100. The apparatus 110 can include the illumination assembly 200, the imaging assembly 300, and the projection assembly 400. Some embodiments of the apparatus 110 can include a media player 848 while other embodiments of the apparatus 110 are configured to connect and communicate with an external media player 848. Different configurations and connection technologies can provide varying degrees of "plug and play" connectivity that can be easily installed and removed by users 90. |
| 111 | Giant Apparatus | An apparatus 111 implementing an embodiment of a giant system 101. Common examples of a giant apparatus 111 include the scoreboards at a professional sports stadium or arena. |
| 112 | Large Apparatus | An apparatus 110 implementing an embodiment of a large system 102. Common examples of large apparatuses 111 include movie theater projectors and large screen television sets. A large apparatus 111 is typically positioned on a floor or some other support structure. A large apparatus 111 such as a flat screen TV can also be mounted on a wall. |
| 113 | Personal Media Apparatus | An apparatus 110 implementing an embodiment of a personal system 103. Many personal apparatuses 112 are highly portable and are supported by the user 90. Other embodiments of personal media apparatuses 112 are positioned on a desk, table, or similar surface. Common examples of personal apparatuses 112 include desktop computers, laptop computers, and portable televisions. |
| 114 | Near-Eye Apparatus | An apparatus 110 implementing an embodiment of a near-eye system 104. Many near-eye apparatuses 114 are either worn on the head (are visor apparatuses 115) or are held in the hand of the user 90. Examples of near-eye apparatuses 114 include smart phones, tablet computers, camera eye-pieces and displays, microscope eye-pieces and displays, gun scopes, and other similar devices. |
| 115 | Visor Apparatus | An apparatus 110 implementing an embodiment of a visor system 105. The visor apparatus 115 is worn on the head 94 of the user 90. The visor apparatus 115 can also be referred simply as a visor 115. |
| 116 | VRD Visor Apparatus | An apparatus 110 in a VRD visor system 105. Unlike a visor apparatus 114, the VRD visor apparatus 115 includes a virtual retinal display that projects the visual image 200 directly on the eyes 92 of the user 90. |
| 120 | Operating Modes | Some embodiments of the system 100 can be implemented in such a way as to support distinct manners of operation. In some embodiments of the system 100, the user 90 can explicitly or implicitly select which operating mode 120 controls. In other embodiments, the system 100 can determine the applicable operating mode 120 in accordance with the processing rules of the system 100. In still other embodiments, the system 100 is implemented in such a manner that supports only one operating mode 1200 with respect to a potential feature. For example, some systems 100 can provide users 90 with a choice between an immersion mode 121 and an augmentation mode 122, while other embodiments of the system 100 may only support one mode 120 or the other. |
| 121 | Immersion | An operating mode 120 of the system 100 in which the outside world is at least substantially blocked off visually from the user 90, such that the images 880 displayed to the user 90 are not superimposed over the actual physical environment of the user 90. In many circumstances, the act of watching a movie is intended to be an immersive experience. |
| 122 | Augmentation | An operating mode 120 of the system 100 in which the image 880 displayed by the system 100 is added to a view of the physical environment of the user 90, i.e. the image 880 augments the real world, i.e. an exterior environment image 650. Google Glass is an example of an electronic display that can function in an augmentation mode. |

-continued

| # | Name | Definition/Description |
|---|------|------------------------|
| 123 | Tracking or Sensing | An operating mode 120 of the system 100 in which the system 100 captures information about the user 90 through one or more sensors. Examples of different categories of sensing can include eye tracking pertaining to the user's interaction with the displayed image 880, biometric scanning such as retina scans to determine the identity of the user 90, and other types of sensor readings/measurements. |
| 124 | Non-Tracking or Non-Sensing | An operating mode 120 of the system 100 in which the system 100 does not capture information about the user 90 or the user's experience with the displayed image 880. |
| 140 | Display Technology | A technology for displaying images. The system 100 can be implemented using a wide variety of different display technologies. |
| 141 | DLP System | An embodiment of the system 100 that utilizes digital light processing (DLP) to compose an image 880 from light 800. |
| 142 | LCD System | An embodiment of the system 100 that utilizes liquid crystal display (LCD) to compose an image 880 from light 800. |
| 143 | LCOS System | An embodiment of the system 100 that utilizes liquid crystal on silicon (LCOS) to compose an image 880 from light 800. |
| 150 | Supporting Components | Regardless of the context and configuration, a system 100 like any electronic display is a complex combination of components and processes. Light 800 moves quickly and continuously through the system 100. Various supporting components 150 are used in different embodiments of the system 100. A significant percentage of the components of the system 100 can fall into the category of supporting components 150 and many such components 150 can be referred to as "conventional optics". Supporting components 160 are necessary in any implementation of the system 100 in that light 800 is an important resource that must be controlled, constrained, directed, and focused to be properly harnessed in the process of transforming light 800 into an image 880 that is displayed to the user 90. The text and drawings of a patent are not intended to serve as product blueprints. One of ordinary skill in the art can devise multiple variations of supplementary components 150 that can be used in conjunction with the innovative elements listed in the claims, illustrated in the drawings, and described in the text. |
| 151 | Mirror | An object that possesses at least a non-trivial magnitude of reflectivity with respect to light. Depending on the context, a particular mirror could be virtually 100% reflective while in other cases merely 50% reflective. Mirrors 151 can be comprised of a wide variety of different materials. |
| 152 | Dichroic Mirror | A mirror 151 with significantly different reflection or transmission properties at two different wavelengths. |
| 160 | Lens | An object that possesses at least a non-trivial magnitude of transmissivity. Depending on the context, a particular lens could be virtually 100% transmissive while in other cases merely about 50% transmissive. A lens 160 is often used to focus light 800. |
| 165 | Spherical Lens | A lens an at least partially spherical shape that is conical on its axis. |
| 170 | Collimator | A device that narrows a beam of light 800. |
| 180 | Doublet | A double-lens paired together. Such an arrangement allows more optical surfaces, thicknesses, and formulations, especially as the space between lenses may be considered an "element." With additional degrees of freedom, optical designers have more latitude to correct more optical aberrations more thoroughly. |
| 190 | Processor | A central processing unit (CPU) that is capable of carrying out the instructions of a computer program. The system 100 can use one or more processors 190 to communicate with and control the various components of the system 100. |
| 191 | Power Source | A source of electricity for the system 100. Examples of power sources include various batteries as well as power adaptors that provide for a cable to provide power to the system 100. |
| 200 | Illumination Assembly | A collection of components used to supply light 800 to the imaging assembly 300. Common example of components in the illumination assembly 200 include light sources 210 and diffusers. The illumination assembly 200 can also be referred to as an illumination subsystem 200. |
| 210 | Light Source | A component that generates light 800. There are a wide variety of different light sources 210 that can be utilized by the system 100. |
| 211 | Multi-Prong Light Source | A light source 210 that includes more than one illumination element. A 3-colored LED lamp 213 is a common example of a multi-prong light source 212. |
| 212 | LED Lamp | A light source 210 comprised of a light emitting diode (LED). |
| 213 | 3 LED Lamp | A light source 210 comprised of three light emitting diodes (LEDs). In some embodiments, each of the three LEDs illuminates a different color, with the 3 LED lamp eliminating the use of a color wheel 240. |

| # | Name | Definition/Description |
|---|---|---|
| 214 | Laser | A light source 210 comprised of a device that emits light through a process of optical amplification based on the stimulated emission of electromagnetic radiation. |
| 215 | OLED Lamp | A light source 210 comprised of an organic light emitting diode (OLED). |
| 216 | CFL Lamp | A light source 210 comprised of a compact fluorescent bulb. |
| 217 | Incandescent Lamp | A light source 210 comprised of a wire filament heated to a high temperature by an electric current passing through it. |
| 218 | Non-Angular Dependent Lamp | A light source 210 that projects light that is not limited to a specific angle. |
| 219 | Arc Lamp | A light source 210 that produces light by an electric arc. |
| 230 | Light Location | A location of a light source 210, i.e. a point where light originates. Configurations of the system 100 that involve the projection of light from multiple light locations 230 can enhance the impact of the diffusers 282. |
| 240 | Color Wheel | A spinning wheel that can be used in a DLP system 141 to infuse color into the image 880. |
| 300 | Imaging Assembly | A collective assembly of components, subassemblies, processes, and light 800 that are used to fashion the image 880 from light 800. In many instances, the image 880 initially fashioned by the imaging assembly 300 can be modified in certain ways as it is made accessible to the user 90. The modulator 320 is the component of the imaging assembly 300 that is primarily responsible for fashioning an image 880 from the light 800 supplied by the illumination assembly 200. |
| 310 | Prism | A substantially transparent object that is often has triangular bases. Some display technologies 140 utilize one or more prisms 310 to direct light 800 to a modulator 320 and to receive an image 880 from the modulator 320. |
| 311 | TIR Prism | A total internal reflection (TIR) prism 310 used in a DLP 141 to direct light to and from a DMD 324. |
| 312 | RTIR Prism | A reverse total internal reflection (RTIR) prism 310 used in a DLP 141 to direct light to and from a DMD 324. |
| 320 | Modulator or Light Modulator | A device that regulates, modifies, or adjusts light 800. Modulators 320 form an image 880 from the light 800 supplied by the illumination assembly 200. |
| 321 | Transmissive-Based Light Modulator | A modulator 320 that fashions an image 880 from light 800 utilizing a transmissive property of the modulator 320. Common examples of reflection-based light modulators 322 include LCDs 330 and LCOSs 340. |
| 322 | Reflection-Based Light Modulator | A modulator 320 that fashions an image 880 from light 800 utilizing a reflective property of the modulator 320. Common examples of reflection-based light modulators 322 include DMDs 324 and LCOSs 340. |
| 324 | DMD | A reflection-based light modulator 322 commonly referred to as a digital micro mirror device. A DMD 324 is typically comprised of a several thousand microscopic mirrors arranged in an array on a processor 190, with the individual microscopic mirrors corresponding to the individual pixels in the image 880. |
| 330 | LCD Panel or LCD | A light modulator 320 in an LCD (liquid crystal display). A liquid crystal display that uses the light modulating properties of liquid crystals. Each pixel of an LCD typically consists of a layer of molecules aligned between two transparent electrodes, and two polarizing filters (parallel and perpendicular), the axes of transmission of which are (in most of the cases) perpendicular to each other. Without the liquid crystal between the polarizing filters, light passing through the first filter would be blocked by the second (crossed) polarizer. Some LCDs are transmissive while other LCDs are transflective. |
| 340 | LCOS Panel or LCOS | A light modulator 320 in an LCOS (liquid crystal on silicon) display. A hybrid of a DMD 324 and an LCD 330. Similar to a DMD 324, except that the LCOS 326 uses a liquid crystal layer on top of a silicone backplane instead of individual mirrors. An LCOS 244 can be transmissive or reflective. |
| 350 | Dichroic Combiner Cube | A device used in an LCOS or LCD display that combines the different colors of light 800 to formulate an image 880. |
| 400 | Projection Assembly | A collection of components used to make the image 880 accessible to the user 90. The projection assembly 400 includes a display 410. The projection assembly 400 can also include various supporting components 150 that focus the image 880 or otherwise modify the interim image 850 transforming it into the image 880 that is displayed to one or more users 90. The projection assembly 400 can also be referred to as a projection subsystem 400. |

-continued

| # | Name | Definition/Description |
|---|---|---|
| 410 | Display or Screen | An assembly, subassembly, mechanism, or device by which visual image 200 is made accessible to the user 90. The display component 120 can be in the form of a panel 122 that is viewed by the user 90 or a screen 126 onto which the visual image 200 is projected onto by a projector 124. In some embodiments, the display component 120 is a retinal projector 128 that projects the visual image 200 directly onto the eyes 92 of the user 90. |
| 412 | Active Screen | A display screen 410 powered by electricity that displays the image 880. |
| 414 | Passive Screen | A non-powered surface on which the image 880 is projected. A conventional movie theater screen is a common example of a passive screen 412. |
| 416 | Eyepiece | A display 410 positioned directly in front of the eye 92 of an individual user 90. |
| 418 | VRD Eyepiece or VRD Display | An "eyepiece" 416 that provides for directly projecting the image 880 on the eyes 92 of the user 90. A VRD eyepiece 418 can also be referred to as a VRD display 418. A VRD eyepiece 418 is typically just a position for the eye 92, as the partially transparent plate 430 reflects the image 880 directly onto the eye 92 of the viewer 96. |
| 420 | Curved Mirror | An at least partially reflective surface that in conjunction with the partially transparent plate 430 projects the image 880 onto the eye 92 of the viewer 96. The curved mirror 420 can perform additional functions in embodiments of the system 100 that include a tracking mode 123 and/or an augmentation mode 122. |
| 422 | Half-Silvered Mirror | A curved mirror 410 that is half-silvered so that it is sufficiently transparent to allow an exterior environment image 650 to pass through the mirror. |
| 430 | Partially Transparent Plate or Plate | A plate that is partially transparent and partially reflective. Embodiments of the system 100 utilizing a tracking mode 123 will require that the plate 430 be at least partially transparent with respect to infrared light as well. The plate 430 and curved mirror 420 function to direct light 800 in a variety of different ways for a variety of different purposes. |
| 449 | Spherical Lens | A lens 160 with a spherical shape. |
| 450 | Aspherical Lens | A lens 160 with an aspherical shape. An aspheric lens 450 is a lens 160 whose surface profiles are not portions of a sphere or cylinder. There are a wide variety of different aspherical lens 450 geometries, including but not limited to $6^{th}$ order aspherical lenses 454 and Zernike lenses 452. |
| 452 | Zernike Lens | A type of aspherical lens 450. |
| 454 | $6^{th}$ Order Aspherical Lens | An aspherical lens 450 where the sag is defined by a polynomial. |
| 470 | Exit Pupil | The exit pupil is the portion of a beam of light where the cross-section is the smallest. The exit pupil can be described as a "virtual aperture" in an optical system. Only rays of light within the exit pupil can be perceived by the human viewer, and such perception is dependent on a sufficient alignment between the exit pupil of the device and the entrance pupil of the human eye. |
| 480 | Drift | A displacement in the exit pupil such that it exits beyond a single point. It is significant that use of a aspheric lens 450 can result in a mere 0.3 mm of drift 480 about one axis where a spherical lens 449 in that precise same configuration can result in an upwards of 1.4 mm or more drift 480 about that same axis. Drift 480 can also be referred to as exit pupil drift 480. |
| 482 | Horizontal Drift | A horizontal component of the exit pupil drift 480. |
| 484 | Vertical Drift | A vertical component of the exit pupil drift 480. |
| 500 | Tracking Assembly | A collection of components that provide for the tracking of the eye 92 of the viewer 96 while the viewer 96 is viewing an image 880. The tracking assembly 500 can include an infrared camera 510, and infrared lamp 520, and variety of supporting components 150. The assembly 500 can also include a quad photodiode array or CCD. |
| 510 | Camera | A component that can generate an image of the eye 92 of the viewer 96 for the purpose of tracking eye movements. The camera 510 is typically an infrared camera 510. |
| 520 | Lamp | A light source for the camera. The lamp 520 is typically an infrared lamp. |
| 600 | Augmentation Assembly | A collection of components that provide for allowing or precluding an exterior environment image 650 from reaching the eye 92 of the viewer 96. |
| 610 | Shutter Component | A device that provides for either allowing or disallowing exterior light 832 from reaching the eyes 92 of the viewer 96 while the apparatus 110 is being worn by the viewer 96. |
| 650 | Exterior Environment Image | An image of the physical environment of the viewer 96. In augmentation mode 122, such images can be viewed by the viewer 96 at the same time that the viewer 96 sees the displayed image 880. In immersion mode 121, such images are blocked. |

-continued

| # | Name | Definition/Description |
|---|---|---|
| 800 | Light | Light 800 is the media through which an image is conveyed, and light 800 is what enables the sense of sight. Light is electromagnetic radiation that is propagated in the form of photons. |
| 830 | Infrared Light | Light 800 that falls in the infrared wavelength of the spectrum and this is not visible to the human eye. Infrared light 830 is typically used by the tracking assembly 500 for the purpose of tracking eye movement. |
| 832 | Exterior Light | Light 800 from the exterior environment of the viewer 96. The augmentation assembly 600 may or may not permit such light to reach the eyes 92 of viewer 96. |
| 840 | Media Content | The image 880 displayed to the user 90 by the system 100 can in many instances, be but part of a broader media experience. A unit of media content 840 will typically include visual attributes 841 and acoustic attributes 842. Tactile attributes 843 are not uncommon in certain contexts. It is anticipated that the olfactory attributes 844 and gustatory attributes 845 may be added to media content 840 in the future. |
| 841 | Visual Attributes | Attributes pertaining to the sense of sight. The core function of the system 100 is to enable users 90 to experience visual content such as images 880 or video 890. In many contexts, such visual content will be accompanied by other types of content, most commonly sound or touch. In some instances, smell or taste content may also be included as part of the media content 840. |
| 842 | Acoustic Attributes | Attributes pertaining to the sense of sound. The core function of the system 100 is to enable users 90 to experience visual content such as images 880 or video 890. However, such media content 840 will also involve other types of senses, such as the sense of sound. The system 100 and apparatuses 110 embodying the system 100 can include the ability to enable users 90 to experience tactile attributes 843 included with other types of media content 840. |
| 843 | Tactile Attributes | Attributes pertaining to the sense of touch. Vibrations are a common example of media content 840 that is not in the form of sight or sound. The system 100 and apparatuses 110 embodying the system 100 can include the ability to enable users 90 to experience tactile attributes 843 included with other types of media content 840. |
| 844 | Olfactory Attributes | Attributes pertaining to the sense of smell. It is anticipated that future versions of media content 840 may include some capacity to engage users 90 with respect to their sense of smell. Such a capacity can be utilized in conjunction with the system 100, and potentially integrated with the system 100. The iPhone app called oSnap is a current example of gustatory attributes 845 being transmitted electronically. |
| 845 | Gustatory Attributes | Attributes pertaining to the sense of taste. It is anticipated that future versions of media content 840 may include some capacity to engage users 90 with respect to their sense of taste. Such a capacity can be utilized in conjunction with the system 100, and potentially integrated with the system 100. |
| 848 | Media Player | The system 100 for displaying the image 880 to one or more users 90 may itself belong to a broader configuration of applications and systems. A media player 848 is device or configuration of devices that provide the playing of media content 840 for users. Examples of media players 848 include disc players such as DVD players and BLU-RAY players, cable boxes, tablet computers, smart phones, desktop computers, laptop computers, television sets, and other similar devices. Some embodiments of the system 100 can include some or all of the aspects of a media player 848 while other embodiments of the system 100 will require that the system 100 be connected to a media player 848. For example, in some embodiments, users 90 may connect a VRD apparatus 116 to a BLU-RAY player in order to access the media content 840 on a BLU-RAY disc. In other embodiments, the VRD apparatus 116 may include stored media content 840 in the form a disc or computer memory component. Non-integrated versions of the system 100 can involve media players 848 connected to the system 100 through wired and/or wireless means. |
| 850 | Interim Image | The image 880 displayed to user 90 is created by the modulation of light 800 generated by one or light sources 210 in the illumination assembly 200. The image 880 will typically be modified in certain ways before it is made accessible to the user 90. Such earlier versions of the image 880 can be referred to as an interim image 850. |
| 860 | Field of View | The geometric angle at which a displayed image 880 can be seen. The field of view 860 can be abbreviated FOV 860. FOV 860 can include a vertical component (a vertical FOV 861) and/or a horizontal component (a horizontal FOV 862), but in most instances, the horizontal FOV 862 is the key aspect of FOV 860. Use of an aspherical lens 450 instead of the a spherical lens 449 can support an expand the FOV 860 of the system 100 from about 40° up to about 66° degrees without incurring a material magnitude of exit pupil drift 480. |

| # | Name | Definition/Description |
|---|---|---|
| 861 | Vertical FOV | The vertical aspect of the FOV 860. |
| 862 | Horizontal FOV | The horizontal aspect of the FOV 860. |
| 880 | Image | A visual representation such as a picture or graphic. The system 100 performs the function of displaying images 880 to one or more users 90. During the processing performed by the system 100, light 800 is modulated into an interim image 850, and subsequent processing by the system 100 can modify that interim image 850 in various ways. At the end of the process, with all of the modifications to the interim image 850 being complete the then final version of the interim image 850 is no longer a work in process, but an image 880 that is displayed to the user 90. In the context of a video 890, each image 880 can be referred to as a frame 882. |
| 882 | Frame | An image 880 that is a part of a video 890. |
| 890 | Video | In some instances, the image 880 displayed to the user 90 is part of a sequence of images 880 can be referred to collectively as a video 890. Video 890 is comprised of a sequence of static images 880 representing snapshots displayed in rapid succession to each other. Persistence of vision in the user 90 can be relied upon to create an illusion of continuity, allowing a sequence of still images 880 to give the impression of motion. The entertainment industry currently relies primarily on frame rates between 24 FPS and 30 FPS, but the system 100 can be implemented at faster as well as slower frame rates. |
| 900 | Method | A process for displaying an image 880 to a user 90. |
| 910 | Illumination Method | A process for generating light 800 for use by the system 100. The illumination method 910 is a process performed by the illumination assembly 200. |
| 920 | Imaging Method | A process for generating an interim image 850 from the light 800 supplied by the illumination assembly 200. The imaging method 920 can also involve making subsequent modifications to the interim image 850. |
| 930 | Display Method | A process for making the image 880 available to users 90 using the interim image 850 resulting from the imaging method 920. The display method 930 can also include making modifications to the interim image 850. The display method 930 includes of an aspherical lens 450 to direct the light 800 making up the image 880 to a destination where it can be viewed by viewers 96. |

The invention claimed is:

1. A system (100) for displaying an image (880) to a user (90), said system (100) comprising:
an illumination assembly (200) that provides for supplying a plurality of light (800);
an imaging assembly (300) that provides for creating an interim image (850) with said plurality of light (800); and
a projection assembly (400) that provides for creating said image (880) by modifying said interim image (850), said projection assembly (400) including an aspheric lens (450), wherein said aspheric lens (450) is a sixth order aspheric lens (454);
wherein said system (100) provides the user (90) a horizontal field of view (862) that is greater than about 60 degrees.

2. The system (100) of claim 1, wherein said aspheric lens (450) is a relay lens that receives said interim image (850) from a modulator (320) in said imaging assembly (300).

3. The system (100) of claim 1, wherein said system (100) is a visor apparatus (115).

4. The system (100) of claim 1, wherein said system (100) is a virtual retinal display (VRD) visor apparatus (116) that projects said image (880) onto an eye (92) of the user (90).

5. The system (100) of claim 1, wherein said system (100) is a digital light processing (DLP) system (141).

6. The system (100) of claim 1, wherein said image (880) does not include substantial exit pupil drift (480) that is visible to the user (90).

7. The system (100) of claim 1, wherein said aspheric lens (450) provides for reducing exit pupil drift (480) for light (800) directed to a splitting plate (430) and a curved mirror (420).

8. The system (100) of claim 1, wherein said aspheric lens (450) provides for correcting a distortion in said interim image (850), and wherein said aspheric lens (450) acts as a field stop.

9. The system (100) of claim 1, wherein said system (100) provides the user (90) with a field of view (860) that is greater than about 40 degrees.

10. The system (100) of claim 1, wherein said system (100) includes a tracking mode (123).

11. The system (100) of claim 1, wherein said system (100) includes augmentation mode (122) and an immersion mode (121).

12. The system (100) of claim 1, wherein said projection assembly (450) further includes a curved mirror (420) and a partially transparent plate (440).

13. A system (100) for displaying an image (880) to a user (90), said system (100) comprising:
an illumination assembly (200) that provides for supplying a plurality of light (800);
an imaging assembly (300) that provides for creating an interim image (850) with said plurality of light (800); and
a projection assembly (400) that provides for creating said image (880) by modifying said interim image (850) comprised of said plurality of light (800), wherein said projection assembly (400) includes an aspheric lens (450) that reduces a pupil drift (470) in said image (880);
wherein said system (100) is a VRD apparatus (116) that provides the user (90) with a horizontal field of view (862) that is greater than about 60 degrees.

14. A method (900) for making an image (880) accessible to a user (90) by projecting said image (880) on an eye (92) of the user (90), said method comprising (900):

generating (910) a plurality of light (800) from a light source (210);

modulating (920) said light (800) into an interim image (850); and directing (930) said light (800) of said interim image (850) in an aspheric lens (450), wherein said aspheric lens (450) is a sixth order aspheric lens (454), prior to the delivery of said light (800) to the eye (92) of the user (90);

wherein said system (100) provides the user (90) a horizontal field of view (862) that is greater than about 60 degrees.

15. The method (900) of claim 14, wherein said aspheric optic lens (450) provides for a horizontal field of view (862) that is greater than about forty degrees.

16. The system (100) of claim 13, wherein said aspheric lens (450) is a relay lens that receives said interim image (850) from a modulator (320) in said imaging assembly (300).

17. The system (100) of claim 13, wherein said aspheric lens (450) is a sixth order aspheric lens (454).

18. The system (100) of claim 13, wherein said aspheric lens (450) provides for correcting a distortion in said interim image (850), and wherein said aspheric lens (450) acts as a field stop.

19. The system (100) of claim 13, wherein said system (100) includes augmentation mode (122) and an immersion mode (121).

\* \* \* \* \*